(12) United States Patent
Zhao

(10) Patent No.: US 11,419,136 B2
(45) Date of Patent: Aug. 16, 2022

(54) INFORMATION FEEDBACK METHOD AND APPARATUS

(71) Applicant: BEIJING XIAOMI MOBILE SOFTWARE CO., LTD., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 144 days.

(21) Appl. No.: 16/961,912

(22) PCT Filed: Jan. 12, 2018

(86) PCT No.: PCT/CN2018/072388
§ 371 (c)(1),
(2) Date: Jul. 13, 2020

(87) PCT Pub. No.: WO2019/136688
PCT Pub. Date: Jul. 18, 2019

(65) Prior Publication Data
US 2020/0389914 A1     Dec. 10, 2020

(51) Int. Cl.
*H04W 72/12*     (2009.01)
*H04W 72/04*     (2009.01)

(52) U.S. Cl.
CPC ..... *H04W 72/1289* (2013.01); *H04W 72/042* (2013.01); *H04W 72/0446* (2013.01); *H04W 72/0453* (2013.01); *H04W 72/1273* (2013.01)

(58) Field of Classification Search
CPC ........... H04W 72/1289; H04W 72/042; H04W 72/0446; H04W 72/0453; H04W 72/1273
(Continued)

(56) References Cited

U.S. PATENT DOCUMENTS 10,952,231 B2 *   3/2021   Liou .................... H04L 5/0094
11,038,657 B2 *   6/2021   Zhou ................... H04L 1/1854
(Continued)

FOREIGN PATENT DOCUMENTS

CN     101394199 A     3/2009
CN     102088341 A     6/2011
(Continued)

OTHER PUBLICATIONS

Intellectual property India, Office Action Issued in Application No. 202047033539, dated Nov. 15, 2021,(6p).
(Continued)

*Primary Examiner* — Peter G Solinsky
(74) *Attorney, Agent, or Firm* — Arch & Lake LLP

(57) ABSTRACT

The present disclosure provides an information feedback method and apparatus. The method is applied to a terminal and includes: receiving downlink data scheduled by one or more pieces of DCI and subjected to information feedback within a specific time unit; determining an uplink transmission mode of uplink feedback information corresponding to the downlink data scheduled by the one or more pieces of DCI, where the uplink transmission mode comprises multiplexing transmission or separate transmission; and sending the corresponding one or more pieces of uplink feedback information to a base station within the specific time unit according to the uplink transmission modes respectively, such that the base station obtains the corresponding one or more pieces of uplink feedback information within the specific time unit according to the uplink transmission modes respectively.

20 Claims, 15 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2016/0088622 A1 | 3/2016 | Dinan | |
| 2019/0098612 A1* | 3/2019 | Babaei | H04W 72/0453 |
| 2020/0059327 A1* | 2/2020 | Kini | H04W 72/042 |
| 2020/0067678 A1* | 2/2020 | Zhou | H04L 1/1812 |
| 2020/0092685 A1* | 3/2020 | Fehrenbach | H04W 4/46 |
| 2020/0313804 A1* | 10/2020 | Ryu | H04L 1/1861 |
| 2020/0382191 A1* | 12/2020 | Seo | H04B 17/24 |
| 2021/0321438 A1* | 10/2021 | Khoshnevisan | H04L 1/1896 |
| 2022/0053522 A1* | 2/2022 | MolavianJazi | H04W 72/1263 |

FOREIGN PATENT DOCUMENTS

| | | | |
|---|---|---|---|
| CN | 102577209 B | 4/2017 | |
| CN | 106797283 A | 5/2017 | |
| CN | 107231222 A | 10/2017 | |
| CN | 107347002 A | 11/2017 | |
| CN | 107370570 A | 11/2017 | |
| CN | 108401488 A | 8/2018 | |
| EP | 2979381 B1 * | 5/2021 | H04J 4/00 |
| WO | 2014067137 A1 | 5/2014 | |

OTHER PUBLICATIONS

European Patent Office, Extended European Search Report Issued in Application No. 18899701.9, dated Mar. 22, 2021, Germany, (13p).
Partial Supplementary European Search Report issued in EP Application No. 18899701.9, dated Dec. 18, 2020, (17p).
International Preliminary Report on Patentability and Written Opinion of the International Searching Authority issued in Application No. PCT/CN2018/072388 dated Sep. 25, 2018, (11p).
Samsung,"HARQ Management and Feedback", 3GPP TSG RAN WG1, R1-1716005, Meeting NR#3, Nagoya, Japan, Sep. 18-21, 2017, (10p).
International Search Report to PCT Application No. PCT/CN2018/072388 dated Sep. 25, 2018 with English translation, (4p).
First Office Action to Chinese Application No. 201880000041.7, dated Jun. 19, 2020 with English translation, (22p).
Hirayama, S. et al., "Performance of Downlink Control Information Signals Using Decision-Feedback Channel Estimation for EPDCCH" 1014 IEEE International Conference on Communication Systems, Jan. 29, 2015 (5p).
Sun Chao, "Study of Wireless Channel State Information Feedback Scheme Based on Compressed Sensing", China Master's Theses Full-text Database, Apr. 30, 2012, (72p).

* cited by examiner

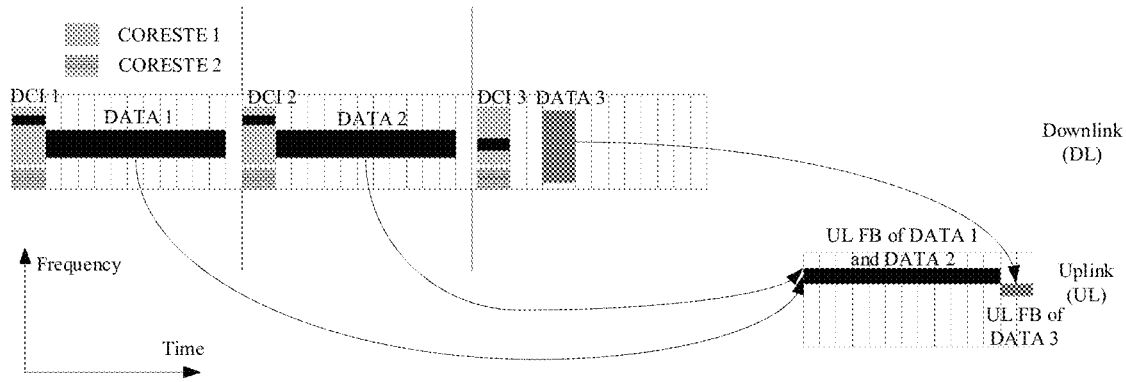

FIG.4B

```
┌─────────────────────────────────────────────────────────────┐
│ Determine a corresponding downlink scheduling category      │
│ according to a position in a time domain occupied by each   │──510
│ of the one or more pieces of DCI, wherein the downlink      │
│ scheduling category comprises slot-based scheduling and/or  │
│ non-slot-based scheduling                                   │
└─────────────────────────────────────────────────────────────┘
                              │
                              ▼
┌─────────────────────────────────────────────────────────────┐
│ Assign one or more pieces of DCI corresponding to a same    │
│ downlink scheduling category to a same group by grouping    │──520
│ each of the one or more pieces of DCI according to          │
│ different downlink scheduling categories                    │
└─────────────────────────────────────────────────────────────┘
                              │
                              ▼
┌─────────────────────────────────────────────────────────────┐
│ Perform multiplexing transmission for pieces of uplink      │──530
│ feedback information corresponding to downlink datum        │
│ scheduled by the pieces of DCI in the same group            │
└─────────────────────────────────────────────────────────────┘
                              │
                              ▼
┌─────────────────────────────────────────────────────────────┐
│ Perform separate transmission for pieces of uplink feedback │──540
│ information corresponding to downlink datum scheduled by    │
│ pieces of DCI in different groups                           │
└─────────────────────────────────────────────────────────────┘
```

FIG.5A

INFORMATION FEEDBACK METHOD AND APPARATUS

CROSS REFERENCE TO RELATED APPLICATIONS

This application is a national phase application based on PCT/CN2018/072388, filed Jan. 12, 2018, the entire content of which is incorporated herein by reference for all purposes.

TECHNICAL FIELD

The present disclosure relates to the field of communication technologies, and in particular to an information feedback method and apparatus.

BACKGROUND

In a new-generation communication system, flexible configuration supporting several service types is needed. Further, different service types correspond to different service requirements. For example, main requirements of an enhanced Mobile Broad Band (eMBB) service type focus on large bandwidth and high rate; main requirements of an Ultra Reliable Low Latency Communication (URLLC) service type focus on high reliability and low latency; main requirements of a massive Machine Type Communication (mMTC) service type focus on a large connection number.

However, in the related art, a user terminal uses an uplink control channel for information feedback only once within a same time unit, which cannot satisfy different service requirements of the different service types in the new generation communication system.

SUMMARY

To solve the problems of the related art, examples of the present disclosure provides an information feedback method and apparatus.

According to a first aspect of the examples of the present disclosure, there is provided an information feedback method applied to a terminal. The method includes:

receiving downlink data scheduled by one or more pieces of Downlink Control Information (DCI) and subjected to information feedback within a specific time unit;

determining an uplink transmission mode of uplink feedback information corresponding to the downlink data scheduled by the one or more pieces of DCI, wherein the uplink transmission mode comprises multiplexing transmission or separate transmission; and sending the corresponding one or more pieces of uplink feedback information to a base station within the specific time unit according to the uplink transmission modes respectively, such that the base station obtains the corresponding one or more pieces of uplink feedback information within the specific time unit according to the uplink transmission modes respectively.

Optionally, determining the uplink transmission mode of the uplink feedback information corresponding to the downlink data scheduled by the one or more pieces of DCI includes:

determining the uplink transmission mode of the uplink feedback information corresponding to the downlink data scheduled by the one or more pieces of DCI according to an information format of the one or more pieces of DCI.

Optionally, determining the uplink transmission mode of the uplink feedback information corresponding to the downlink data scheduled by the one or more pieces of DCI according to the information format of the one or more pieces of DCI includes:

assigning one or more pieces of DCI with a same information format to a same group by grouping the one or more pieces of DCI according to different information formats, and;

performing multiplexing transmission for pieces of uplink feedback information corresponding to downlink datum scheduled by the pieces of DCI in the same group; and performing separate transmission for pieces of uplink feedback information corresponding to downlink datum scheduled by pieces of DCI in different groups.

Optionally, determining the uplink transmission mode of the uplink feedback information corresponding to the downlink data scheduled by the one or more pieces of DCI includes:

determining the uplink transmission mode of the uplink feedback information corresponding to the downlink data scheduled by the one or more pieces of DCI according to a time-frequency resource occupied by the one or more pieces of DCI.

Optionally, determining the uplink transmission mode of the uplink feedback information corresponding to the downlink data scheduled by the one or more pieces of DCI according to the time-frequency resource occupied by the one or more pieces of DCI includes:

determining a resource set of a downlink control channel used by the one or more pieces of DCI;

assigning one or more pieces of DCI using a same resource set of a downlink control channel to a same group by grouping the one or more pieces of DCI according to different resource sets of the downlink control channel;

performing multiplexing transmission for pieces of uplink feedback information corresponding to downlink datum scheduled by the pieces of DCI in the same group; and performing separate transmission for pieces of uplink feedback information corresponding to downlink datum scheduled by pieces of DCI in different groups.

Optionally, determining the uplink transmission mode of the uplink feedback information corresponding to the downlink data scheduled by the one or more pieces of DCI according to the time-frequency resource occupied by the one or more pieces of DCI includes:

determining a corresponding downlink scheduling category according to a position in a time domain occupied by the one or more pieces of DCI, wherein the downlink scheduling category comprises slot-based scheduling and/or non-slot-based scheduling;

assigning one or more pieces of DCI corresponding to a same downlink scheduling category to a same group by grouping the one or more pieces of DCI according to different downlink scheduling categories;

performing multiplexing transmission for pieces of uplink feedback information corresponding to downlink datum scheduled by the pieces of DCI in the same group; and performing separate transmission for pieces of uplink feedback information corresponding to downlink datum scheduled by pieces of DCI in different groups.

Optionally, determining the uplink transmission mode of the uplink feedback information corresponding to the downlink data scheduled by the one or more pieces of DCI includes:

determining the uplink transmission mode of the uplink feedback information corresponding to the downlink data scheduled by the one or more pieces of DCI according to an information format of the one or more pieces of DCI and a time-frequency resource occupied by the one or more pieces of DCI.

Optionally, determining the uplink transmission mode of the uplink feedback information corresponding to the downlink data scheduled by the one or more pieces of DCI includes:

determining the uplink transmission mode of the uplink feedback information corresponding to the downlink data scheduled by the one or more pieces of DCI according to indication information comprised in the one or more pieces of DCI.

Optionally, the indication information comprises a user identifier.

Determining the uplink transmission mode of the uplink feedback information corresponding to the downlink data scheduled by the one or more pieces of DCI according to the indication information comprised in the one or more pieces of DCI includes:

determining the user identifier indicated by the one or more pieces of DCI;

assigning one or more pieces of DCI indicating a same user identifier to a same group by grouping the one or more pieces of DCI according to different user identifiers;

performing multiplexing transmission for pieces of uplink feedback information corresponding to downlink datum scheduled by the pieces of DCI in the same group; and performing separate transmission for pieces of uplink feedback information corresponding to downlink datum scheduled by pieces of DCI in different groups.

Optionally, the indication information includes downlink data time-frequency scheduling information.

Determining the uplink transmission mode of the uplink feedback information corresponding to the downlink data scheduled by the one or more pieces of DCI according to the indication information comprised in the one or more pieces of DCI includes:

determining the downlink data time-frequency scheduling information indicated by the one or more pieces of DCI;

assigning one or more pieces of DCI indicating same downlink data time-frequency scheduling information to a same group by grouping the one or more pieces of DCI according to different downlink data time-frequency scheduling information;

performing multiplexing transmission for pieces of uplink feedback information corresponding to downlink datum scheduled by the pieces of DCI in the same group; and performing separate transmission for pieces of uplink feedback information corresponding to downlink datum scheduled by pieces of DCI in different groups.

Optionally, the downlink data time-frequency scheduling information includes a transmission duration for transmitting the downlink data.

Assigning the one or more pieces of DCI indicating the same downlink data time-frequency scheduling information to the same group by grouping the one or more pieces of DCI according to different downlink data time-frequency scheduling includes:

assigning one or more pieces of DCI indicating a same transmission duration to the same group by grouping the one or more pieces of DCI according to different transmission durations.

Optionally, the downlink data time-frequency scheduling information includes a subcarrier spacing for transmitting the downlink data.

Assigning the one or more pieces of DCI indicating the same downlink data time-frequency scheduling information to the same group by grouping the one or more pieces of DCI according to different downlink data time-frequency scheduling includes:

assigning one or more pieces of DCI indicating a same subcarrier spacing to the same group by grouping the one or more pieces of DCI according to different subcarrier spacings.

Optionally, the downlink data time-frequency scheduling information includes a bandwidth part for transmitting the downlink data.

Assigning the one or more pieces of DCI indicating the same downlink data time-frequency scheduling information to the same group by grouping the one or more pieces of DCI according to different downlink data time-frequency scheduling includes:

assigning one or more pieces of DCI indicating a same bandwidth part to the same group by grouping the one or more pieces of DCI according to different bandwidth parts.

Optionally, the indication information includes a time interval between a downlink data and uplink feedback scheduled by DCI.

Determining the uplink transmission mode of the uplink feedback information corresponding to the downlink data scheduled by the one or more pieces of DCI according to the indication information comprised in the one or more pieces of DCI includes:

determining the time interval between the downlink data and the uplink feedback scheduled by the one or more pieces of DCI and a time range to which the time interval belongs;

assigning one or more pieces of DCI belonging to a same time range to a same group by grouping the one or more pieces of DCI according to different time ranges;

performing multiplexing transmission for pieces of uplink feedback information corresponding to downlink datum scheduled by the pieces of DCI in the same group; and performing separate transmission for pieces of uplink feedback information corresponding to downlink datum scheduled by pieces of DCI in different groups.

Optionally, determining the uplink transmission mode of the uplink feedback information corresponding to the downlink data scheduled by the one or more pieces of DCI includes:

determining the uplink transmission mode of the uplink feedback information corresponding to the downlink data scheduled by the one or more pieces of DCI according to a time-frequency resource position of an uplink control channel used by uplink feedback and indicated by the one or more pieces of DCI.

Optionally, determining the uplink transmission mode of the uplink feedback information corresponding to the downlink data scheduled by the one or more pieces of DCI according to the time-frequency resource position of the uplink control channel used by the uplink feedback and indicated by the one or more pieces of DCI includes:

determining the time-frequency resource position of the uplink control channel used by the uplink feedback and indicated by the one or more pieces of DCI;

assigning one or more pieces of DCI indicating a same time-frequency resource position to a same group by grouping the one or more pieces of DCI according to different time-frequency resource positions of the uplink control channel;

performing multiplexing transmission for pieces of uplink feedback information corresponding to downlink datum scheduled by the pieces of DCI in the same group; and performing separate transmission for pieces of uplink feedback information corresponding to downlink datum scheduled by pieces of DCI in different groups.

Optionally, determining the time-frequency resource position of the uplink control channel used by the uplink feedback and indicated by the one or more pieces of DCI includes:

determining a number of uplink feedback total payloads indicated by the one or more pieces of DCI;

determining a resource set used by the uplink feedback according to the number of the uplink feedback total payloads; and determining the time-frequency resource position of the uplink control channel used by the uplink feedback according to the resource set.

Optionally, determining the uplink transmission mode of the uplink feedback information corresponding to the downlink data scheduled by the one or more pieces of DCI according to the time-frequency resource position of the uplink control channel used by the uplink feedback and indicated by the one or more pieces of DCI includes:

determining a start position in a time domain of the uplink control channel used by the uplink feedback and indicated by the one or more pieces of DCI;

assigning one or more pieces of DCI indicating a same start position in the time domain to a same group by grouping the one or more pieces of DCI according to different start positions in the time domain;

performing multiplexing transmission for pieces of uplink feedback information corresponding to downlink datum scheduled by the pieces of DCI in the same group; and performing separate transmission for pieces of uplink feedback information corresponding to downlink datum scheduled by pieces of DCI in different groups.

Optionally, determining the uplink transmission mode of the uplink feedback information corresponding to the downlink data scheduled by the one or more pieces of DCI according to the time-frequency resource position of the uplink control channel used by the uplink feedback and indicated by the one or more pieces of DCI includes:

determining a start position and ending position in a time domain of the uplink control channel used by the uplink feedback and indicated by the one or more pieces of DCI;

determining whether the uplink control channels used by the pieces of uplink feedback and indicated by the pieces of DCI have an overlapping portion in the time domain between each other according to the start positions and ending positions in the time domain;

in response to that the uplink control channels have the overlapping portion in the time domain between each other, assigning pieces of DCI associated with the overlapping portion in the time domain to a same group by grouping the one or more pieces of DCI according to different uplink control channels;

performing multiplexing transmission for pieces of uplink feedback information corresponding to downlink datum scheduled by the pieces of DCI in the same group; and performing separate transmission for pieces of uplink feedback information corresponding to downlink datum scheduled by pieces of DCI in different groups.

According to a second aspect of the examples of the present disclosure, there is provided an information feedback apparatus applied to a terminal. The apparatus includes:

a receiving module configured to receive downlink data scheduled by one or more pieces of DCI and subjected to information feedback within a specific time unit;

a determining module configured to determining an uplink transmission mode of uplink feedback information corresponding to the downlink data scheduled by the one or more pieces of DCI, wherein the uplink transmission mode comprises multiplexing transmission or separate transmission; and a sending module configured to send the corresponding one or more pieces of uplink feedback information to a base station within the specific time unit according to the uplink transmission modes respectively, such that the base station obtains the corresponding one or more pieces of uplink feedback information within the specific time unit according to the uplink transmission modes respectively.

Optionally, the determining module includes:

a first determining sub-module configured to determine the uplink transmission mode of the uplink feedback information corresponding to the downlink data scheduled by each piece of DCI according to an information format of the one or more pieces of DCI.

Optionally, the first determining sub-module includes:

a first grouping sub-module configured to assign one or more pieces of DCI with a same information format to a same group by grouping the one or more pieces of DCI according to different information formats;

a first multiplexing transmission sub-module configured to perform multiplexing transmission for pieces of uplink feedback information corresponding to downlink datum scheduled by the pieces of DCI in the same group; and a first separate transmission sub-module configured to perform separate transmission for pieces of uplink feedback information corresponding to downlink datum scheduled by pieces of DCI in different groups.

Optionally, the determining module includes:

a second determining sub-module configured to determine the uplink transmission mode of the uplink feedback information corresponding to the downlink data scheduled by the one or more pieces of DCI according to a time-frequency resource occupied by the one or more pieces of DCI.

Optionally, the second determining sub-module includes:

a resource set determining sub-module configured to determine a resource set of a downlink control channel used by the one or more pieces of DCI;

a second grouping sub-module configured to assign one or more pieces of DCI using a same resource set of a downlink control channel to a same group by grouping the one or more pieces of DCI according to different resource sets of the downlink control channel;

a second multiplexing transmission sub-module configured to perform multiplexing transmission for pieces of uplink feedback information corresponding to downlink datum scheduled by the pieces of DCI in the same group; and a second separate transmission sub-module configured to perform separate transmission for pieces of uplink feedback information corresponding to downlink datum scheduled by pieces of DCI in different groups.

Optionally, the second determining sub-module includes:

a scheduling category determining sub-module configured to determine a corresponding downlink scheduling category according to a position in a time domain occupied by the one or more pieces of DCI, wherein the downlink scheduling category comprises slot-based scheduling and/or non-slot-based scheduling;

a third grouping sub-module configured to assign one or more pieces of DCI corresponding to a same downlink scheduling category to a same group by grouping the one or more pieces of DCI according to different downlink scheduling categories;

a third multiplexing transmission sub-module configured to perform multiplexing transmission for pieces of uplink feedback information corresponding to downlink datum scheduled by the pieces of DCI in the same group; and a third separate transmission sub-module configured to perform separate transmission for pieces of uplink feedback information corresponding to downlink datum scheduled by pieces of DCI in different groups.

Optionally, the determining module includes:

a third determining sub-module configured to determine the uplink transmission mode of the uplink feedback information corresponding to the downlink data scheduled by the one or more pieces of DCI according to an information format of the one or more pieces of DCI and a time-frequency resource occupied by the one or more pieces of DCI.

Optionally, the determining module includes:

a fourth determining sub-module configured to determine the uplink transmission mode of the uplink feedback information corresponding to the downlink data scheduled by the one or more pieces of DCI according to indication information comprised in the one or more pieces of DCI.

Optionally, the indication information includes a user identifier.

The fourth determining sub-module includes:

a user identifier determining sub-module configured to determine the user identifier indicated by the one or more pieces of DCI;

a fourth grouping sub-module configured to assign one or more pieces of DCI indicating a same user identifier to a same group by grouping the one or more pieces of DCI according to different user identifiers;

a fourth multiplexing transmission sub-module configured to perform multiplexing transmission for pieces of uplink feedback information corresponding to downlink datum scheduled by the pieces of DCI in the same group; and a fourth separate transmission sub-module configured to perform separate transmission for pieces of uplink feedback information corresponding to downlink datum scheduled by pieces of DCI in different groups.

Optionally, the indication information includes downlink data time-frequency scheduling information.

The fourth determining sub-module includes:

a scheduling information determining sub-module configured to determine the downlink data time-frequency scheduling information indicated by the one or more pieces of DCI;

a fifth grouping sub-module configured to assign one or more pieces of DCI indicating same downlink data time-frequency scheduling information to a same group by grouping the one or more pieces of DCI according to different downlink data time-frequency scheduling information;

a fifth multiplexing transmission sub-module configured to perform multiplexing transmission for pieces of uplink feedback information corresponding to downlink datum scheduled by the pieces of DCI in the same group; and a fifth separate transmission sub-module configured to perform separate transmission for pieces of uplink feedback information corresponding to downlink datum scheduled by pieces of DCI in different groups.

Optionally, the downlink data time-frequency scheduling information includes a transmission duration for transmitting the downlink data.

The fifth grouping sub-module includes:

a transmission duration grouping sub-module configured to assign one or more pieces of DCI indicating a same transmission duration to the same group by grouping the one or more pieces of DCI according to different transmission durations.

Optionally, the downlink data time-frequency scheduling information includes a subcarrier spacing for transmitting the downlink data.

The fifth grouping sub-module includes:

a subcarrier spacing grouping sub-module configured to assign one or more pieces of DCI indicating a same subcarrier spacing to the same group by grouping the one or more pieces of DCI according to different subcarrier spacings.

Optionally, the downlink data time-frequency scheduling information includes a bandwidth part for transmitting the downlink data.

The fifth grouping sub-module includes:

a bandwidth part grouping sub-module configured to assign one or more pieces of DCI indicating a same bandwidth part to the same group by grouping the one or more pieces of DCI according to different bandwidth parts.

Optionally, the indication information includes a time interval between a downlink data and uplink feedback scheduled by DCI.

The fourth determining sub-module includes:

a time range determining sub-module configured to determine the time interval between the downlink data and the uplink feedback scheduled by the one or more pieces of DCI and a time range to which the time interval belongs;

a sixth grouping sub-module configured to assign one or more pieces of DCI belonging to a same time range to a same group by grouping the one or more pieces of DCI according to different time ranges;

a sixth multiplexing transmission sub-module configured to perform multiplexing transmission for pieces of uplink feedback information corresponding to downlink datum scheduled by the pieces of DCI in the same group; and a sixth separate transmission sub-module configured to perform separate transmission for pieces of uplink feedback information corresponding to downlink datum scheduled by pieces of DCI in different groups.

Optionally, the determining module includes:

a fifth determining sub-module configured to determine the uplink transmission mode of the uplink feedback information corresponding to the downlink data scheduled by the one or more pieces of DCI according to a time-frequency resource position of an uplink control channel used by uplink feedback and indicated by the one or more pieces of DCI.

Optionally, the fifth determining sub-module includes:

a first position determining sub-module configured to determine the time-frequency resource position of the uplink control channel used by the uplink feedback and indicated by the one or more pieces of DCI;

a seventh grouping sub-module configured to assign one or more pieces of DCI indicating a same time-frequency resource position to a same group by grouping the one or more pieces of DCI according to different time-frequency resource positions of the uplink control channel;

a seventh multiplexing transmission sub-module configured to perform multiplexing transmission for pieces of uplink feedback information corresponding to downlink datum scheduled by the pieces of DCI in the same group; and a seventh separate transmission sub-module configured to perform separate transmission for pieces of uplink feedback information corresponding to downlink datum scheduled by pieces of DCI in different groups.

Optionally, the first position determining sub-module includes:

a payload number determining sub-module configured to determine a number of uplink feedback total payloads indicated by the one or more pieces of DCI;

a resource set determining sub-module configured to determine a resource set used by the uplink feedback according to the number of the uplink feedback total payloads; and a second position determining sub-module configured to determine the time-frequency resource position of the uplink control channel used by the uplink feedback according to the resource set.

Optionally, the fifth determining sub-module includes:

a third position determining sub-module configured to determine a start position in a time domain of the uplink control channel used by the uplink feedback and indicated by the one or more pieces of DCI;

an eighth grouping sub-module configured to assign one or more pieces of DCI indicating a same start position in the time domain to a same group by grouping the one or more pieces of DCI according to different start positions in the time domain;

an eighth multiplexing transmission sub-module configured to perform multiplexing transmission for pieces of uplink feedback information corresponding to downlink datum scheduled by the pieces of DCI in the same group; and an eighth separate transmission sub-module configured to perform separate transmission for pieces of uplink feedback information corresponding to downlink datum scheduled by pieces of DCI in different groups.

Optionally, the fifth determining sub-module includes:

a fourth position determining sub-module configured to determine a start position and ending position in a time domain of the uplink control channel used by the uplink feedback and indicated by the one or more pieces of DCI;

a determining sub-module configured to determine whether the uplink control channels used by the pieces of uplink feedback and indicated by the pieces of DCI have an overlapping portion in the time domain between each other according to the start positions and ending positions in the time domain;

a ninth grouping sub-module configured to, in response to determining that there is the overlapping portion in the time domain by the determining sub-module, assign pieces of DCI indicating uplink control channels having the overlapping portion in the time domain to a same group by grouping the one or more pieces of DCI according to different uplink control channels;

a ninth multiplexing transmission sub-module configured to perform multiplexing transmission for pieces of uplink feedback information corresponding to downlink datum scheduled by the pieces of DCI in the same group; and a ninth separate transmission sub-module configured to perform separate transmission for pieces of uplink feedback information corresponding to downlink datum scheduled by pieces of DCI in different groups.

According to a third aspect of the examples of the present disclosure, there is provided a non-transitory computer readable storage medium storing computer programs, where the computer programs are used to perform the above information feedback method according to the first aspect.

According to a fourth aspect of the examples of the present disclosure, there is provided an information feedback apparatus applied to a terminal. The apparatus includes:

a processor; and a memory storing instructions executable by the processor.

The processor is configured to:

receive downlink data scheduled by one or more pieces of DCI and subjected to information feedback within a specific time unit;

determine an uplink transmission mode of uplink feedback information corresponding to the downlink data scheduled by the one or more pieces of DCI, wherein the uplink transmission mode comprises multiplexing transmission or separate transmission; and send the corresponding one or more pieces of uplink feedback information to a base station within the specific time unit according to the uplink transmission modes respectively, such that the base station obtains the corresponding one or more pieces of uplink feedback information within the specific time unit according to the uplink transmission modes respectively.

The technical solutions of the examples of the present disclosure may include the following beneficial effects.

In the present disclosure, after receiving the downlink data scheduled by the one or more pieces of DCI and subjected to information feedback within the specific time unit, the terminal may firstly determine the uplink transmission mode of uplink feedback information corresponding to the downlink data scheduled by the one or more pieces of DCI, where the uplink transmission mode includes multiplexing transmission or separate transmission, and then send the corresponding one or more pieces of uplink feedback information to the base station within the specific time unit according to the uplink transmission modes determined by the terminal respectively. Such that the base station may obtain the corresponding one or more pieces of uplink feedback information within the specific time unit according to the uplink transmission modes determined by the terminal. Thus, the transmission of uplink feedback information by using different uplink control channels in the same time unit is realized, which satisfies different service requirements of different service types in the new generation communication system, and improves the utility of information feedback.

It is understood that the above general descriptions and subsequent detailed descriptions are merely illustrative and explanatory and shall not be intended to limit the present disclosure.

BRIEF DESCRIPTION OF THE DRAWINGS

The accompanying drawings, which are incorporated in and constituted a part of this specification, illustrate examples consistent with the present disclosure and, together with the description, serve to explain the principles of the disclosure.

FIG. 4B is a schematic diagram of determining an uplink transmission mode according to an example.

FIG. 5A is a flowchart illustrating another information feedback method according to an example.

DETAILED DESCRIPTION OF THE EMBODIMENTS

Figure 1:
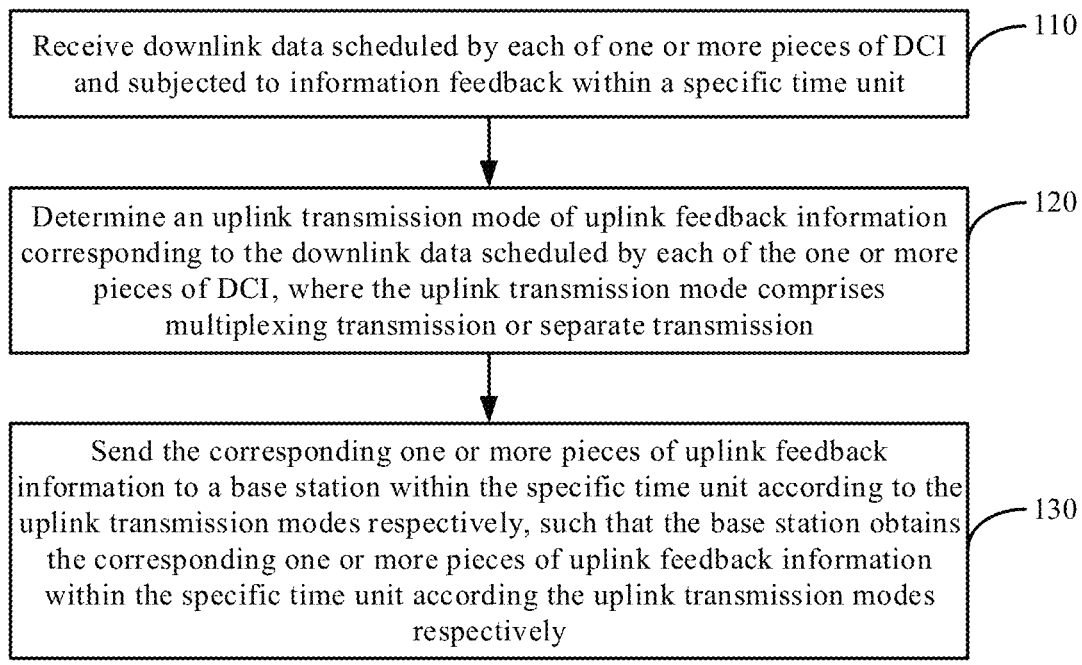
FIG. 1 is a flowchart illustrating an information feedback method according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

In a new-generation communication system, flexible configuration supporting several service types is needed. Further, different service types correspond to different service requirements. For example, main requirements of an eMBB service type focus on large bandwidth and high rate; main requirements of a URLLC service type focus on high reliability and low latency; main requirements of an mMTC service type focus on a large connection number.

In the new generation communication system, flexible transmission format and transmission time-frequency resource of Physical Uplink Control Channel (PUCCH) are defined to better support flexible service requirements. Further, in the new generation communication system, a same user terminal is supported to use one or more temporal non-overlapping time-frequency resources of an uplink control channel within the same time unit to perform uplink transmission.

In a system of Long-Term Evolution (LTE), if a user terminal receives downlink data scheduled by downlink control information (DCI) within the nth-kth time unit, the user terminal is to feed back information on whether the downlink data is successfully received or not within the nth time unit. The k value here may be greater than 1 and may be preset in a protocol. The user terminal may determine the number of uplink feedback payloads to be fed back within the nth time unit by counting the number of all possible data transmission within the nth-kth time unit.

In the new generation communication system, due to introduction of dynamic scheduling time and dynamic feedback time, the k value depends on semi-persistent configuration from a base station and a dynamic indication in the DCI. For example, the base station semi-persistently configures a table of time intervals between downlink data reception and uplink feedback and notifies the user terminal exactly which value in the table to use through an indication in the DCI. Similar to the LTE, the user terminal may determine the number of uplink feedback payloads to be fed back within the nth time unit by counting the number of all pieces of possible data transmission within the nth-kth time unit.

In the new generation communication system, the user terminal may be configured with a plurality of resource sets of an uplink control channel. The user terminal determines which resource set of the uplink control channel can be used according to the calculated number of the uplink feedback payloads and determines which resource of the uplink control channel can be used according to the information included in DCI and a time-frequency resource position used by the DCI.

In the LTE and the current new generation communication system, it is always assumed that the user terminal only uses the uplink control channel only once within a same time unit for information feedback, which cannot satisfy different service requirements of different service types in the new generation communication system.

For example, the user terminal may perform transmission of an eMBB service and a URLLC service at the same time. Because the eMBB service and the URLLC service have different service requirements, for example, different bit error rate requirements, it is likely to use different uplink control channels to transmit uplink feedback information respectively within the same time unit. At this time, the user terminal requires a new mechanism to determine which pieces of uplink feedback information associated with downlink data are to be multiplexed together for transmission.

Thus, the present disclosure provides an information feedback method. This information feedback method is a method used by a user terminal to determine which pieces of uplink feedback information associated with the downlink data are to be multiplexed together for transmission within a specific time unit.

An example of the information feedback in the present disclosure will be described in detailed below in combination with accompanying drawings.

Figure 2:
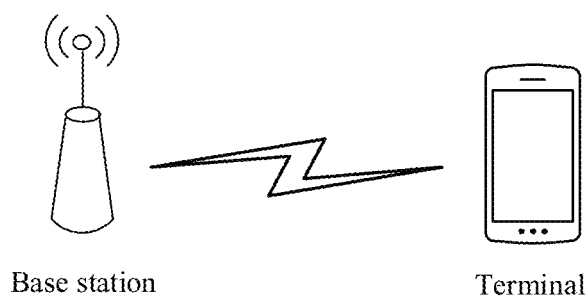
FIG. 2 is a scenario diagram illustrating an information feedback method according to an example.

FIG. 1 is a flowchart illustrating an information feedback method according to an example. FIG. 2 is a scenario diagram illustrating an information feedback method according to an example. The information feedback method may be applied to a terminal. As shown in FIG. 1, the information feedback method may include the following steps 110-130.

At step 110, downlink data scheduled by one or more pieces of DCI and subjected to information feedback within a specific time unit is received.

In an example of the present disclosure, if a user terminal receives the downlink datum scheduled by the one or more pieces of DCI within the nth-kth time unit, the user terminal is to feed back information, within the nth time unit, whether the downlink datum are successfully received or not. The nth time unit may be a specific time unit for performing information feedback.

At step 120, an uplink transmission mode of uplink feedback information corresponding to the downlink data scheduled by the one or more pieces of DCI is determined, where the uplink transmission mode includes multiplexing transmission or separate transmission.

In an example of the present disclosure, the user terminal needs to determine which pieces of uplink feedback information corresponding to downlink datum are to be multiplexing-transmitted and which pieces of uplink feedback information corresponding to the downlink datum are to be separately transmitted within the specific time unit.

At step 130, the corresponding one or more pieces of uplink feedback information are sent to a base station within the specific time unit according to the uplink transmission modes determined by the terminal respectively, such that the base station obtains the corresponding one or more pieces of uplink feedback information within the specific time unit according to the uplink transmission modes determined by the terminal respectively.

As shown in FIG. 2, an illustrative scenario includes a terminal and a base station. After receiving the downlink data scheduled by each piece of DCI and subjected to information feedback within a nth time unit, the user terminal is to firstly determine which pieces of uplink feedback information corresponding to downlink datum scheduled by pieces of DCI are to be multiplexing-transmitted, in this case, the uplink transmission mode is multiplexing transmission, and determine which pieces of uplink feedback information corresponding to downlink datum scheduled by pieces of DCI are to be separately transmitted, in this case, the uplink transmission mode is separate transmission. And then, the user terminal sends the corresponding pieces of uplink feedback information to the base station within the nth time unit according to the determined multiplexing transmission or separate transmission, so that the base station obtains the corresponding pieces of uplink feedback information within the nth time unit according to the multiplexing transmission or separate transmission.

As can be seen from the above example, after receiving the downlink data scheduled by the one or more pieces of DCI and subjected to information feedback within the specific time unit, the uplink transmission mode of uplink feedback information corresponding to the downlink data scheduled by the one or more pieces of DCI is firstly determined, where the uplink transmission mode includes multiplexing transmission or separate transmission, and then the corresponding one or more pieces of uplink feedback information are sent to a base station within the specific time unit based on the uplink transmission modes determined by the terminal respectively. Such that the base station may obtain the corresponding one or more pieces of uplink feedback information within the specific time unit according to the uplink transmission modes determined by the terminal. Thus, the transmission of uplink feedback information by using different uplink control channels in the same time unit is realized, which satisfies different service requirements of different service types in the new generation communication system, and improves the utility of information feedback.

In an example, when step 120 is performed on the basis of the method shown in FIG. 1, the uplink transmission mode of the uplink feedback information corresponding to the downlink data scheduled by the one or more pieces of DCI may be determined according to an information format of the one or more pieces of DCI.

In an example of the present disclosure, several information formats of DCI are defined in both LTE and new generation communication system. Generally, different information formats of DCI implement different functions or apply to different scenarios. For example, an information format of DCI for scheduling uplink data transmission is different from an information format of DCI for scheduling downlink data transmission. Likewise, the information format of DCI for scheduling downlink data also includes several different formats, and information fields and DCI payload lengths included in different information formats of DCI are different.

As can be seen from the above example, the uplink transmission mode of the uplink feedback information corresponding to the downlink data scheduled by the one or more pieces of DCI may be determined according to the information format of the one or more pieces of DCI, therefore improving the reliability of determining the uplink transmission mode.

Figure 3:
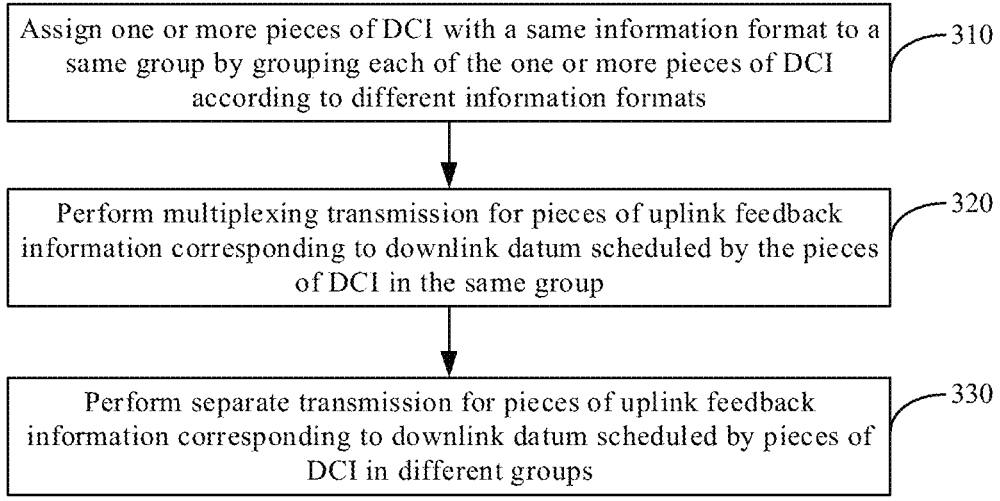
FIG. 3 is a flowchart illustrating another information feedback method according to an example.

FIG. 3 is a flowchart illustrating another information feedback method according to an example. The information feedback method may be applied to a terminal. As shown in FIG. 3, determining the uplink transmission mode of the uplink feedback information corresponding to the downlink data scheduled by the one or more pieces of DCI according to the information format of the one or more pieces of DCI may include the following steps 310-330.

At step 310, one or more pieces of DCI with a same information format are assigned to a same group by grouping the one or more pieces of DCI according to different information formats.

In an example of the present disclosure, when each piece of the DCI is grouped according to different information formats, the one or more pieces of DCI with the same information format are assigned to the same group, or information formats of DCI in different groups are different. Pieces of DCI having different information formats are allowed to be grouped into the same group, while the pieces of DCI having the same information format are not allowed to be grouped into different groups.

For example, each piece of DCI that requires information feedback within the specific time unit may be DCI 1, DCI 2 and DCI 3 respectively. Information formats of DCI 1 and DCI 2 are the same, while information format of DCI 3 is different from that of DCI 1 and DCI 2. At this time, DCI 1 and DCI 2 may be assigned to one group, and DCI 3 may be assigned to another group separately.

For another example, each piece of DCI that requires information feedback within the specific time unit may be DCI 1, DCI 2 and DCI 3 respectively. Information formats of DCI 1, DCI 2 and DCI 3 are all different from each other. At this time, DCI 1 and DCI 2 may also be grouped into one group, and DCI 3 may be grouped into another group separately.

At step 320, multiplexing transmission is performed for pieces of uplink feedback information corresponding to downlink datum scheduled by the pieces of DCI in the same group.

At step 330, separate transmission is performed for pieces of uplink feedback information corresponding to downlink datum scheduled by pieces of DCI in different groups.

As can be seen from the above example, different pieces of DCI may be grouped according to different information formats, the one or more pieces of DCI with the same information format are assigned to the same group, the pieces of uplink feedback information corresponding to the downlink datum scheduled by the pieces of DCI in the same group are multiplexing-transmitted, and the pieces of uplink feedback information corresponding to the downlink datum scheduled by the pieces of DCI in different groups are separately transmitted. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

In an example, when step 120 is performed on the basis of the method shown in FIG. 1, the uplink transmission mode of the uplink feedback information corresponding to the downlink data scheduled by the one or more pieces of DCI may be determined according to a time-frequency resource occupied by the one or more pieces of DCI.

As can be seen from the above example, the uplink transmission mode of the uplink feedback information corresponding to the downlink data scheduled by each piece of the DCI may be determined according to the time-frequency resource occupied by each piece of the DCI, so as to improve the reliability of determining the uplink transmission mode.

Figure 4A:
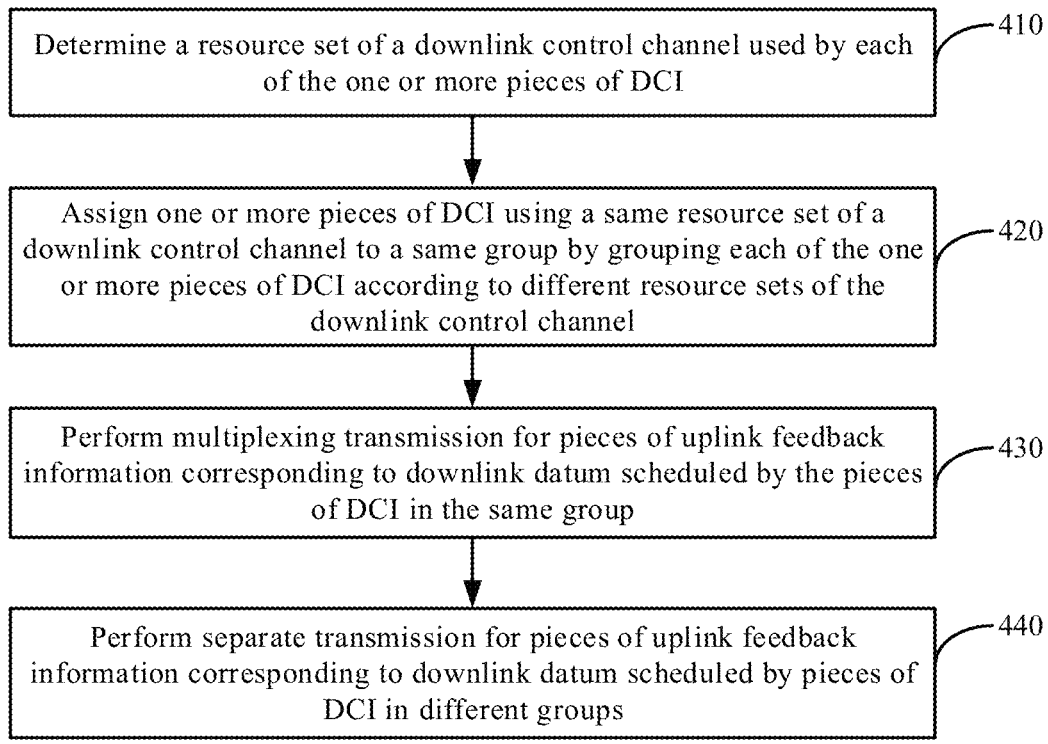
FIG. 4A is a flowchart illustrating another information feedback method according to an example.

FIG. 4A is a flowchart illustrating another information feedback method according to an example. FIG. 4B is a schematic diagram of determining an uplink transmission mode according to an example. The information feedback method may be applied to a terminal. As shown in FIG. 4A, determining the uplink transmission mode of the uplink feedback information corresponding to the downlink data scheduled by the one or more pieces of DCI according to the information format of the one or more pieces of DCI may include the following steps 410-440.

At step 410, a resource set of a downlink control channel used by the one or more pieces of DCI is determined.

In an example of the present disclosure, a Control Resource Set (CORESET) defines time-frequency resources that include a downlink control channel for a user. In the CORESET, the user may search for a downlink control signal, and each piece of the DCI only occupies a part resource in the CORESET. As shown in FIG. 4B, a rectangular block marked DCI 1 represents a resource in the CORESET used by DCI 1, a rectangular block marked DCI 2 represents a resource in the CORESET used by DCI 2, and a rectangular block marked DCI 3 represents a resource in the CORESET used by DCI 3.

At step 420, one or more pieces of DCI using a same resource set of a downlink control channel are assigned to a same group by grouping the one or more pieces of DCI according to different resource sets of the downlink control channels.

In an example of the present disclosure, when each piece of the DCI is grouped according to different resource sets of the downlink control channel, the one or more pieces of DCI with the same resource set of the downlink control channel are assigned to the same group, or the resource sets of the downlink control channel used by pieces of DCI in different groups are different. Pieces of DCI having different resource sets of the downlink control channel are allowed to be divided into the same group, while the pieces of DCI having the same resource set of the downlink control channel are not allowed to be divided into different groups.

At step 430, multiplexing transmission is performed for pieces of uplink feedback information corresponding to the downlink datum scheduled by the pieces of DCI in the same group.

At step 440, separate transmission is performed for pieces of uplink feedback information corresponding to downlink datum scheduled by pieces of DCI in different groups.

As shown in FIG. 4B, each piece of DCI for which the user terminal is to perform information feedback within the specific time unit is DCI 1, DCI 2 and DCI 3 respectively. Resources in the CORESET used by DCI 1 and DCI 2 are the same, while a resource in the CORESET used by DCI 3 is different from that of DCI 1 and DCI 2. At this time, DCI 1 and DCI 2 may be divided into one group, and DCI 3 is assigned to another group separately. Further, multiplexing transmission is performed for pieces of uplink feedback information corresponding to downlink datum scheduled by DCI 1 and DCI 2, and separate transmission is performed for uplink feedback information corresponding to downlink data scheduled by DCI 3.

As can be seen from the above example, different pieces of DCI may be grouped according to different resource sets of the downlink control channel, the one or more pieces of DCI with the same resource set of the downlink control channel are grouped to the same group, the pieces of uplink feedback information corresponding to the downlink datum scheduled by the pieces of DCI in the same group are multiplexing-transmit, and the pieces of uplink feedback information corresponding to the downlink datum scheduled by the pieces of DCI in different groups are separately transmit. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

Figure 5B:
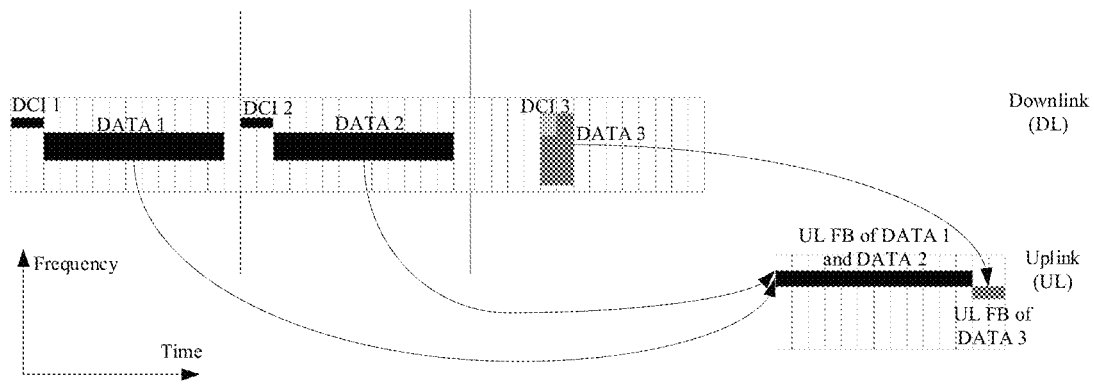
FIG. 5B is another schematic diagram of determining an uplink transmission mode according to an example.

FIG. 5A is a flowchart illustrating another information feedback method according to an example. FIG. 5B is another schematic diagram of determining an uplink transmission mode according to an example. The information feedback method may be applied to a terminal. As shown in FIG. 5A, determining the uplink transmission mode of the uplink feedback information corresponding to the downlink data scheduled by the one or more pieces of DCI according to the time-frequency resource occupied by the one or more pieces of DCI may include the following steps 510-540.

At step 510, a corresponding downlink scheduling category is determined according to a position in a time domain occupied by the one or more pieces of DCI, where the downlink scheduling category includes slot-based scheduling and/or non-slot-based scheduling.

In an example of the present disclosure, data of the downlink control channel with the slot-based scheduling may appear at a position in a time domain being the first 2 to 3 symbols in a slot, and whether it is the first 2 symbols or the first 3 symbols may be configured by a system. Data of the downlink control channel with non-slot-based scheduling may appear at other symbols in a slot. Here, different downlink scheduling categories may be distinguished according to the position in the time domain occupied by each piece of DCI, so as to multiplex pieces of uplink feedback associated with downlink datum having the same scheduling category together.

At step 520, one or more pieces of DCI corresponding to a same downlink scheduling category are assigned to a same group by grouping the one or more pieces of DCI according to different downlink scheduling categories.

In an example of the present disclosure, when each piece of the DCI is grouped according to different downlink scheduling categories, the one or more pieces of DCI with the same downlink scheduling category are assigned to the same group, or the downlink scheduling categories correspond to different groups are different. Pieces of DCI having different downlink scheduling categories are allowed to be divided into the same group, while the pieces of DCI having the same downlink scheduling category are not allowed to be divided into different groups.

At step 530, multiplexing transmission is performed for pieces of uplink feedback information corresponding to the downlink datum scheduled by the pieces of DCI in the same group.

At step 540, separate transmission is performed for pieces of uplink feedback information corresponding to downlink datum scheduled by pieces of DCI in different groups.

As shown in FIG. 5B, each piece of DCI for which the user terminal is to perform information feedback within the specific time unit is DCI 1, DCI 2 and DCI 3 respectively. Time domain positions occupied by DCI 1 and DCI 2 both are the first 2 symbols, and thus DCI 1 and DCI 2 correspond to the same downlink scheduling category. A position in a time domain occupied by DCI 3 is different from that of DCI 1 and DCI 2. At this time, DCI 1 and DCI 2 may be divided into one group and DCI 3 is assigned to another group separately. Further, multiplexing transmission is performed for pieces of uplink feedback information corresponding to the downlink datum scheduled by DCI 1 and DCI 2, and separate transmission is performed for the uplink feedback information corresponding to the downlink data scheduled by DCI 3.

As can be seen from the above example, different pieces of DCI may be grouped according to different downlink scheduling categories, the one or more pieces of DCI with the same downlink scheduling category are grouped to the same group, the pieces of uplink feedback information corresponding to the downlink datum scheduled by the pieces of DCI in the same group are multiplexing-transmit, and the pieces of uplink feedback information corresponding to the downlink datum scheduled by the pieces of DCI in different groups are separately transmit. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

In an example, when step 120 is performed on the basis of the method shown in FIG. 1, the uplink transmission mode of the uplink feedback information corresponding to the downlink data scheduled by the one or more pieces of DCI may be determined according to the information format of the one or more pieces of DCI and the time-frequency resource occupied by the one or more pieces of DCI.

In an example of the present disclosure, different pieces of DCI may be grouped according to different information formats and different resource sets of the downlink control channel, one or more pieces of DCI having the same information format are assigned to a same group, and one or more pieces of DCI using the same resource set of the downlink control channel are assigned to a same group.

As can be seen from the above example, the uplink transmission mode of the uplink feedback information corresponding to the downlink data scheduled by each piece of the DCI may be determined according to the information format of each piece of the DCI and the time-frequency resource occupied by each piece of the DCI, so as to improve the reliability of determining the uplink transmission mode.

In an example, when step 120 is performed on the basis of the method shown in FIG. 1, the uplink transmission mode of the uplink feedback information corresponding to the downlink data scheduled by the one or more pieces of DCI may be determined according to indication information included in the one or more pieces of DCI.

As can be seen from the above example, the uplink transmission mode of the uplink feedback information corresponding to the downlink data scheduled by each piece of DCI may be determined according to the indication information included in each piece of DCI, so as to improve the accuracy of determining the uplink transmission mode.

Figure 6:
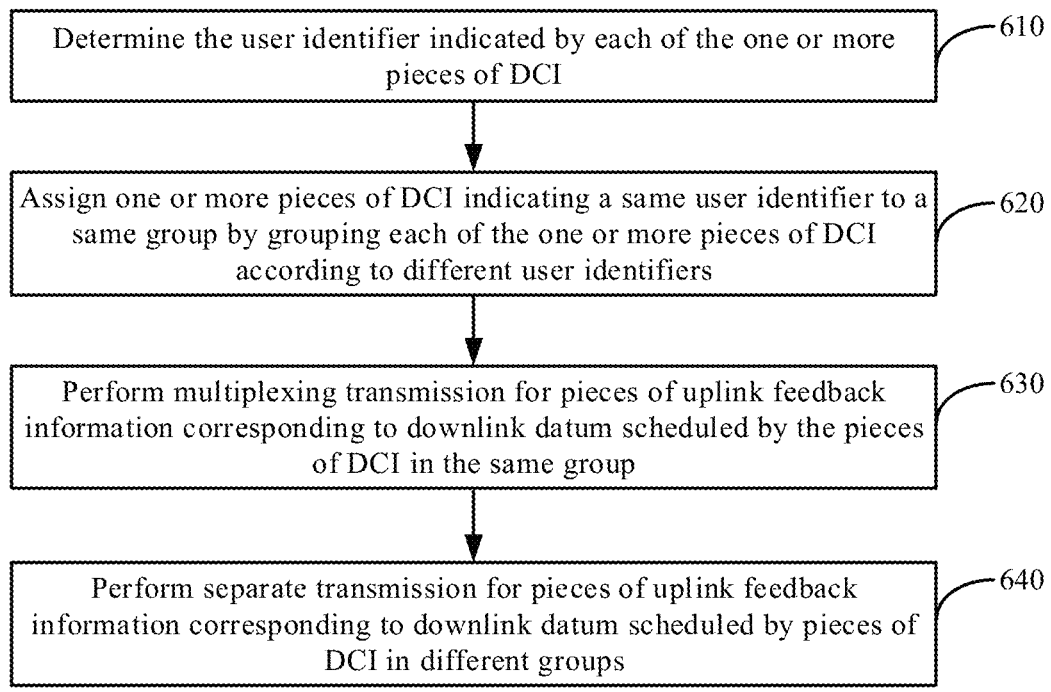
FIG. 6 is a flowchart illustrating another information feedback method according to an example.

FIG. 6 is a flowchart illustrating another information feedback method according to an example. The information feedback method may be applied to a terminal. As shown in FIG. 6, determining the uplink transmission mode of the uplink feedback information corresponding to the downlink data scheduled by the one or more pieces of DCI according to the indication information included in the one or more pieces of DCI may include the following steps 610-640, where the indication information includes a user identifier.

At step 610, the user identifier indicated by the one or more pieces of DCI is determined.

In an example of the present disclosure, the same user may be assigned different user identifiers to represent different types of data transmissions. For example, a Cell Radio Network Temporary Identifier (C-RNTI) for dynamic scheduling data transmission and a Semi-Persistent Scheduling Radio Network Temporary Identifier (SPS-RNTI) for semi-persistent scheduling transmission. For the same terminal, no matter what kind of Radio Network Temporary Identifiers (RNTIs) scheduled downlink data transmission, associated Hybrid Automatic Repeat reQuests (HARQs) will be multiplexed together for transmission.

At step 620, one or more pieces of DCI indicating a same user identifier are assigned to a same group by grouping the one or more pieces of DCI according to different user identifiers.

In an example of the present disclosure, when each piece of DCI is grouped according to different user identifiers, the one or more pieces of DCI indicating the same user identifier may be divided into the same group, or the user identifiers indicated by DCI in the different groups are different. Pieces of DCI having different user identifiers are allowed to be divided into the same group, while the pieces of DCI having the same user identifier are not allowed to be divided into different groups.

For example, each piece of DCI that requires information feedback within the specific time unit may be DCI 1, DCI 2 and DCI 3 respectively. User identifiers indicated by DCI 1 and DCI 2 are the same, while a user identifier indicated by DCI 3 is different from that indicated by DCI 1 and DCI 2. At this time, DCI 1 and DCI 2 may be assigned to one group, and DCI 3 may be assigned to another group separately.

For another example, each piece of DCI that requires information feedback within the specific time unit may be DCI 1, DCI 2 and DCI 3 respectively. User identifiers indicated by DCI 1, DCI 2 and DCI 3 are different from each other. At this time, DCI 1 and DCI 2 may also be grouped into one group, and DCI 3 may be grouped into another group separately.

At step 630, multiplexing transmission is performed for pieces of uplink feedback information corresponding to downlink datum scheduled by the pieces of DCI in the same group.

At step 640, separate transmission is performed for pieces of uplink feedback information corresponding to downlink datum scheduled by pieces of DCI in different groups.

As can be seen from the above example, different pieces of DCI may be grouped according to different user identifiers, the one or more pieces of DCI indicating the same user identifier are divided into the same group, the pieces of uplink feedback information corresponding to the downlink datum scheduled by the pieces of DCI in the same group are multiplexing-transmitted, and the pieces of uplink feedback information corresponding to the downlink datum scheduled by the pieces of DCI in different groups are separately transmitted. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

Figure 7A:
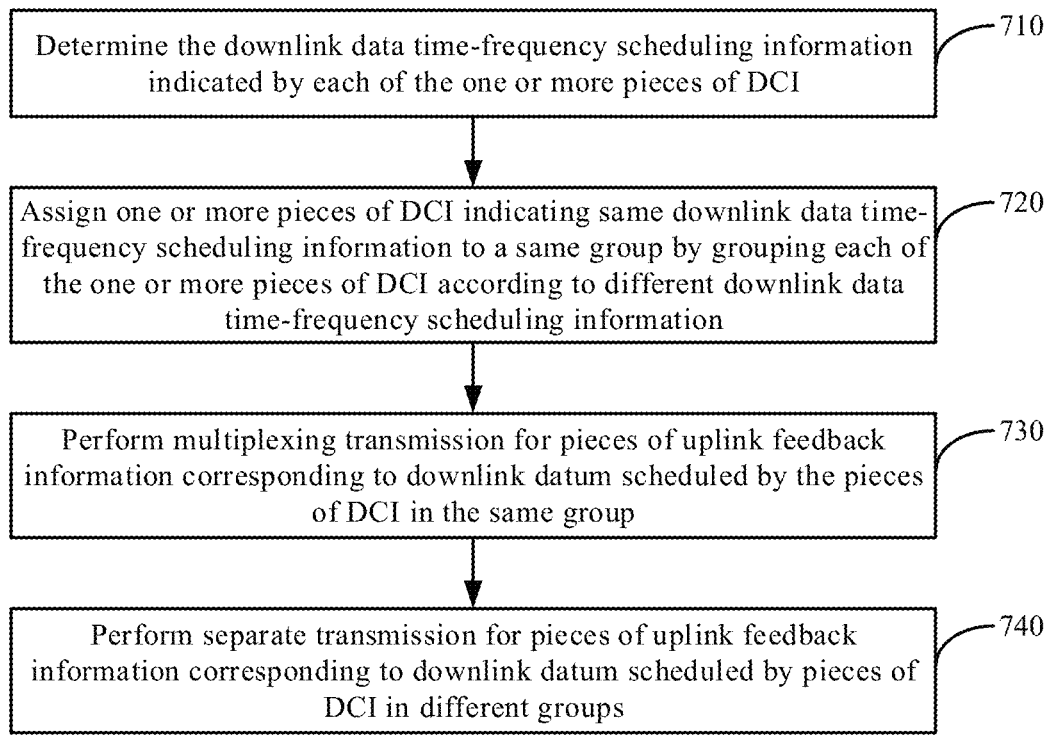
FIG. 7A is a flowchart illustrating another information feedback method according to an example.
Figure 7B:
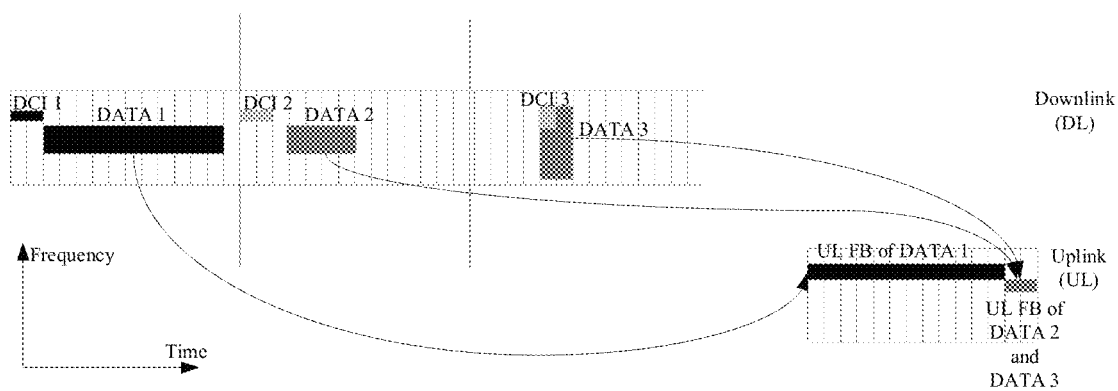
FIG. 7B is another schematic diagram of determining an uplink transmission mode according to an example.

FIG. 7A is a flowchart illustrating another information feedback method according to an example. FIG. 7B is another schematic diagram of determining an uplink transmission mode according to an example. The information feedback method may be applied to a terminal. As shown in FIG. 7A, determining the uplink transmission mode of the uplink feedback information corresponding to the downlink data scheduled by the one or more pieces of DCI according to the indication information included in the one or more pieces of DCI may include the following steps 710-740, where the indication information includes downlink data time-frequency scheduling information.

At step 710, the downlink data time-frequency scheduling information indicated by the one or more pieces of DCI is determined.

In an example of the present disclosure, the same user may be assigned different user identifiers to represent different types of data transmissions. For example, a C-RNTI for dynamic scheduling data transmission and an SPS-RNTI for semi-persistent scheduling transmission. For the same terminal, no matter what kind of RNTIs scheduled downlink data transmission, associated HARQs will be multiplexed together for transmission.

At step 720, one or more pieces of DCI indicating same downlink data time-frequency scheduling information are assigned to a same group by grouping the one or more pieces of DCI according to different downlink data time-frequency scheduling information.

In an example of the present disclosure, when each piece of DCI is grouped according to different downlink data time-frequency scheduling information, the one or more pieces of DCI indicating the same downlink data time-frequency scheduling information may be divided into the same group, or downlink data time-frequency scheduling information indicated by DCI in the different groups are different. Pieces of DCI indicating different downlink data time-frequency scheduling information are allowed to be divided into the same group, while the pieces of DCI indicating the same downlink data time-frequency scheduling information are not allowed to be divided into different groups.

For example, each piece of DCI that requires information feedback within the specific time unit may be DCI 1, DCI 2 and DCI 3 respectively. Pieces of downlink data time-frequency scheduling information indicated by DCI 1 and DCI 2 are the same, while downlink data time-frequency scheduling information indicated by DCI 3 is different from that indicated by DCI 1 and DCI 2. At this time, DCI 1 and DCI 2 may be assigned to one group, and DCI 3 may be assigned to another group separately.

For another example, each piece of DCI that requires information feedback within the specific time unit may be DCI 1, DCI 2 and DCI 3 respectively. Pieces of downlink data time-frequency scheduling information indicated by DCI 1, DCI 2 and DCI 3 respectively are different from each other. At this time, DCI 1 and DCI 2 may also be grouped into one group, and DCI 3 may be grouped into another group separately.

At step 730, multiplexing transmission is performed for pieces of uplink feedback information corresponding to downlink datum scheduled by the pieces of DCI in the same group.

At step 740, separate transmission is performed for pieces of uplink feedback information corresponding to downlink datum scheduled by pieces of DCI in different groups.

As can be seen from the above example, different pieces of DCI may be grouped according to different downlink data time-frequency scheduling information, the one or more pieces of DCI indicating the same downlink data time-frequency scheduling information are divided into the same group, the pieces of uplink feedback information corresponding to the downlink datum scheduled by the pieces of DCI in the same group are multiplexing-transmitted, and the pieces of uplink feedback information corresponding to the downlink datum scheduled by the pieces of DCI in different groups are separately transmitted. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

In an example, based on the method shown in FIG. 7A, the downlink data time-frequency scheduling information includes a transmission duration for transmitting downlink data. When step 720 is performed, the one or more pieces of DCI may be grouped according to different transmission durations, and one or more pieces of DCI indicating a same transmission duration are assigned to a same group.

In an example of the present disclosure, the transmission duration of the downlink data within one slot may be 1-14 symbols. Here, grouping may be performed by defining a threshold. For example, the threshold is set to 7, then a downlink data with a transmission duration smaller than 7 symbols will be divided into one group, and a downlink data with a transmission duration equal to or greater than 7 symbols will be divided into another group. Grouping may also be performed by defining a set. For example, a downlink data having 1-7 symbols will be defined as one group and the downlink data having 8-14 symbols will be defined as another group.

As shown in FIG. 7B, each piece of DCI for which the user terminal is to perform information feedback within the specific time unit is DCI 1, DCI 2 and DCI 3 respectively. A transmission duration of a downlink data (DATA 1) scheduled by DCI 1 is 7 symbols, a transmission duration of a downlink data (DATA 2) scheduled by DCI 2 is 4 symbols, and a transmission duration of a downlink data (DATA 3) scheduled by DCI 3 is 2 symbols. In response to that the downlink data with the transmission duration smaller than 7 symbols may be divided into one group and the downlink data with the transmission duration equal to or greater than 7 symbols may be divided into another group, DCI 2 and DCI 3 may be divided into one group, and DCI 1 is divided into another group separately. In this way, multiplexing transmission may be performed for pieces of uplink feedback information corresponding to the downlink datum scheduled by DCI 2 and DCI 3 and separate transmission is performed for the uplink feedback information corresponding to the downlink data scheduled by DCI 1.

As can be seen from the above example, different pieces of DCI may be grouped according to different transmission durations, the one or more pieces of DCI indicating the same transmission duration are divided into the same group, thereby improving the reliability of grouping the DCI.

In an example, based on the method shown in FIG. 7A, the downlink data time-frequency scheduling information includes a subcarrier spacing for transmitting downlink data. When step 720 is performed, the one or more pieces of DCI may be grouped according to different subcarrier spacings, and one or more pieces of DCI indicating a same subcarrier spacing are assigned to a same group.

As can be seen from the above example, different pieces of DCI may be grouped according to different subcarrier spacings, the one or more pieces of DCI indicating the same subcarrier spacing are divided into the same group, thereby improving the reliability of grouping the DCI.

In an example, based on the method shown in FIG. 7A, the downlink data time-frequency scheduling information includes a bandwidth part (BWP) for transmitting downlink data. When step 720 is performed, the one or more pieces of DCI may be grouped according to different BWPs, and one or more pieces of DCI indicating a same BWP are assigned to a same group.

As can be seen from the above example, different pieces of DCI may be grouped according to different BWPs, the one or more pieces of DCI indicating the same BWP are divided into the same group, thereby improving the reliability of grouping the DCI.

In addition, in the above examples, the downlink data time-frequency scheduling information may include a transmission duration for transmitting downlink data, and/or a subcarrier spacing for transmitting downlink data, and/or a BWP for transmitting downlink data. When step 720 is performed, different pieces of DCI may be grouped in combination with the transmission duration for transmitting downlink data, and/or the subcarrier spacing for transmitting downlink data, and/or the BWP for transmitting downlink data, and its specific grouping manner is not limited herein.

Figure 8:
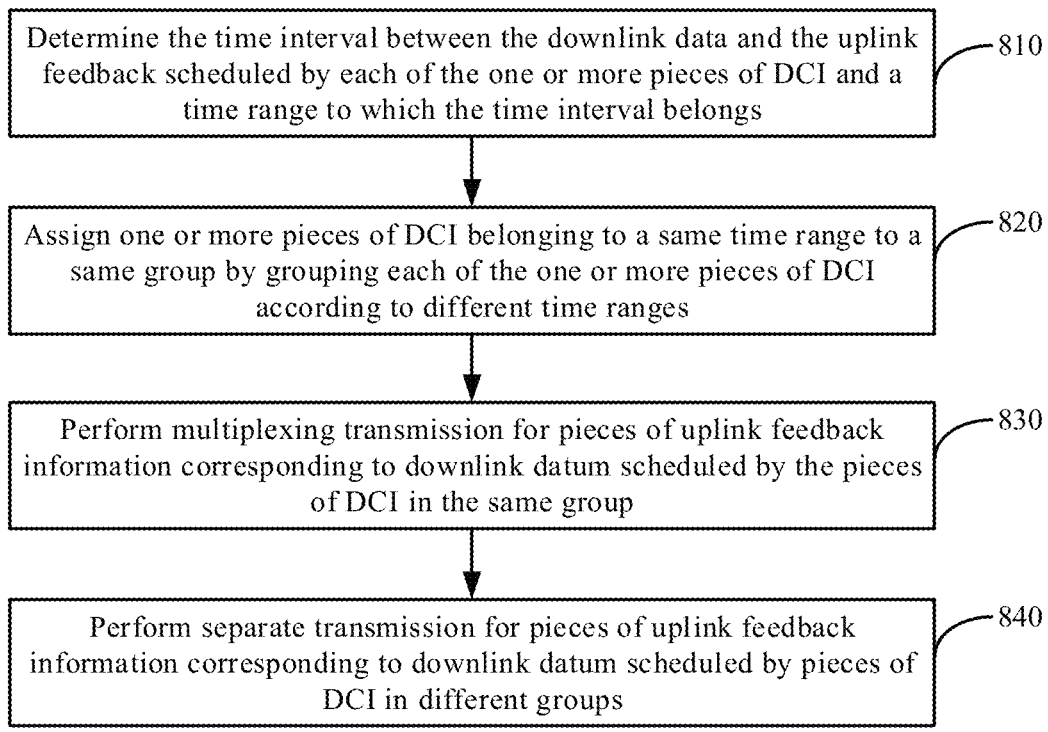
FIG. 8 is a flowchart illustrating another information feedback method according to an example.

FIG. 8 is a flowchart illustrating another information feedback method according to an example. The information feedback method may be applied to a terminal. As shown in FIG. 8, determining the uplink transmission mode of the uplink feedback information corresponding to the downlink data scheduled by the one or more pieces of DCI according to the indication information included in the one or more pieces of DCI may include the following steps 810-840, where the indication information includes a time interval between a downlink data and uplink feedback scheduled by DCI.

At step 810, the time interval between the downlink data and the uplink feedback scheduled by the one or more pieces of DCI and a time range to which the time interval belongs are determined.

In an example of the present disclosure, a value range of the time interval between the downlink data and the uplink feedback scheduled by each piece of the DCI is greater than zero.

The user terminal may preset different time ranges so that the time range to which the time interval between the downlink data and the uplink feedback scheduled by each piece of the DCI belongs can be determined according to the time interval.

For example, the time interval between the downlink data and the uplink feedback scheduled by each piece of the DCI is {k0, k1, . . . kn}, where {k9, k1, . . . km} corresponds to one time range and {km+1, . . . kn} corresponds to another time range.

At step 820, one or more pieces of DCI belonging to a same time range are assigned to a same group by grouping the one or more pieces of DCI according to different time ranges.

In an example of the present disclosure, when each piece of DCI is grouped according to different time ranges, the one or more pieces of DCI belonging to the same time range may be divided into the same group, or pieces of DCI in the different groups belong to different time ranges. Pieces of DCI belonging to different time ranges are allowed to be divided into the same group, while the pieces of DCI belonging to the same time range are not allowed to be divided into different groups.

For example, each piece of DCI that requires information feedback within the specific time unit may be DCI 1, DCI 2 and DCI 3 respectively. DCI 1 and DCI 2 belong to a same time range, while DCI 3 belongs to a different time range than that of DCI 1 and DCI 2. At this time, DCI 1 and DCI 2 may be assigned to one group, and DCI 3 may be assigned to another group separately.

For another example, each piece of DCI that requires information feedback within the specific time unit may be DCI 1, DCI 2 and DCI 3 respectively. Time ranges to which DCI 1, DCI 2 and DCI 3 belongs respectively are different from each other. At this time, DCI 1 and DCI 2 may also be grouped into one group, and DCI 3 may be grouped into another group separately.

At step 830, multiplexing transmission is performed for pieces of uplink feedback information corresponding to downlink datum scheduled by the pieces of DCI in the same group.

At step 840, separate transmission is performed for pieces of uplink feedback information corresponding to downlink datum scheduled by pieces of DCI in different groups.

As can be seen from the above example, different pieces of DCI may be grouped according to different time ranges, the one or more pieces of DCI belonging to the same time range are divided into the same group, the pieces of uplink feedback information corresponding to the downlink datum scheduled by the pieces of DCI in the same group are multiplexing-transmitted, and the pieces of uplink feedback information corresponding to the downlink datum scheduled by the pieces of DCI in different groups are separately transmitted. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

In an example, when step 120 is performed on the basis of the method shown in FIG. 1, the uplink transmission mode of the uplink feedback information corresponding to the downlink data scheduled by the one or more pieces of DCI may be determined according to a time-frequency resource position of an uplink control channel used by uplink feedback and indicated by the one or more pieces of DCI.

As can be seen from the above example, the uplink transmission mode of the uplink feedback information corresponding to the downlink data scheduled by each piece of DCI may be determined according to the time-frequency resource position of the uplink control channel which is used by the uplink feedback and indicated by each piece of the DCI, so as to improve the accuracy of determining the uplink transmission mode.

Figure 9A:
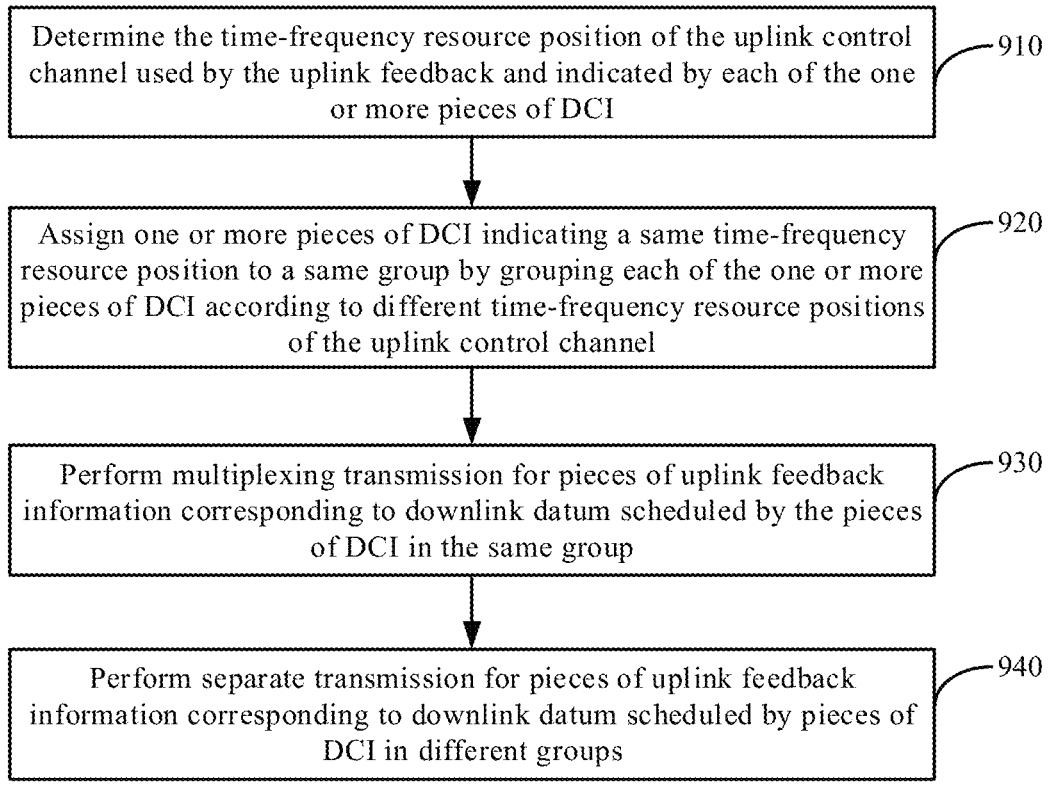
FIG. 9A is a flowchart illustrating another information feedback method according to an example.
Figure 9B:
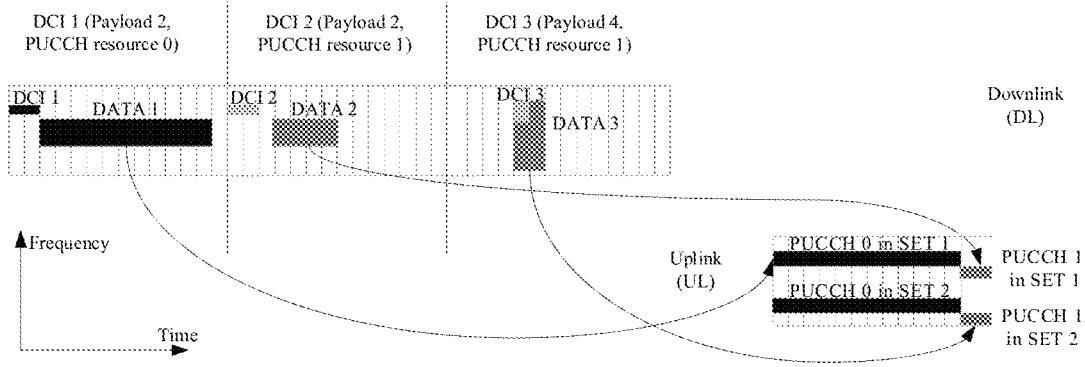
FIG. 9B is another schematic diagram of determining an uplink transmission mode according to an example.

FIG. 9A is a flowchart illustrating another information feedback method according to an example. FIG. 9B is another schematic diagram of determining an uplink transmission mode according to an example. The information feedback method may be applied to a terminal. As shown in FIG. 9A, determining the uplink transmission mode of the uplink feedback information corresponding to the downlink data scheduled by the one or more pieces of DCI according to the time-frequency resource position of the uplink control channel used by the uplink feedback and indicated by the one or more pieces of DCI may include the following steps 910-940.

At step 910, the time-frequency resource position of the uplink control channel used by the uplink feedback and indicated by the one or more pieces of DCI is determined.

In an example of the present disclosure, if time-frequency resource positions of the uplink control channels used by pieces of uplink feedback and indicated by pieces of DCI are the same, the pieces of uplink feedback may be multiplexed together for transmission; otherwise, the pieces of uplink feedback may be transmitted separately.

At step 920, one or more pieces of DCI indicating a same time-frequency resource position are assigned to a same group by grouping the one or more pieces of DCI according to different time-frequency resource positions of the uplink control channel.

In an example of the present disclosure, when each piece of DCI is grouped according to different time-frequency resource positions of the uplink control channel, the one or more pieces of DCI indicating the same time-frequency resource position may be divided into the same group, or time-frequency resource positions indicated by DCI in different groups are different. Pieces of DCI indicating different time-frequency resource positions are allowed to be divided into the same group, while the pieces of DCI indicating the same time-frequency resource position are not allowed to be divided into different groups.

For example, each piece of DCI that requires information feedback within the specific time unit may be DCI 1, DCI 2 and DCI 3 respectively. Time-frequency resource positions indicated by DCI 1 and DCI 2 are the same, while time-frequency resource position indicated by DCI 3 is different from that indicated by DCI 1 and DCI 2. At this time, DCI 1 and DCI 2 may be assigned to one group, and DCI 3 may be assigned to another group separately.

For another example, each piece of DCI that requires information feedback within the specific time unit may be DCI 1, DCI 2 and DCI 3 respectively. Time-frequency resource positions indicated by DCI 1, DCI 2 and DCI 3 respectively are different from each other. At this time, DCI 1 and DCI 2 may also be grouped into one group, and DCI 3 may be grouped into another group separately.

At step 930, multiplexing transmission is performed for pieces of uplink feedback information corresponding to downlink datum scheduled by the pieces of DCI in the same group.

At step 940, separate transmission is performed for pieces of uplink feedback information corresponding to downlink datum scheduled by pieces of DCI in different groups.

As can be seen from the above example, different pieces of DCI may be grouped according to different time-frequency resource positions of the uplink control channel, the one or more pieces of DCI indicating the same time-frequency resource position are divided into the same group, the pieces of uplink feedback information corresponding to the downlink datum scheduled by the pieces of DCI in the same group are multiplexing-transmitted, and the pieces of uplink feedback information corresponding to the downlink datum scheduled by the pieces of DCI in different groups are separately transmitted. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

In an example, when step 910 is performed on the basis of the method shown in FIG. 9A, a number of uplink feedback total payloads indicated by the one or more pieces of DCI is firstly determined; a resource set used by uplink feedback is then determined according to the determined number of the uplink feedback total payloads; finally, the time-frequency resource position of the uplink control channel used by the uplink feedback is determined according to the determined resource set.

In the new generation communication system, the terminal may be configured with a plurality of uplink feedback resource sets [SET 1, SET 2 . . . ], and each resource set includes a plurality of uplink feedback resources, for example, SET 1={resource 1, resource 2, . . . }.

The terminal needs to determine which set is to be used according to the number of the uplink feedback total payloads. For example, when the number of the payloads is no greater than 2, SET 1 is used. When the number of the payloads is greater than 2 and smaller than N 1, SET 2 is used. When the number of the payloads is greater than N 1 and smaller than N 2, SET 3 is used. The values of N1 and N2 may be configured by the base station. After a resource set to be used is determined, if the number of resources in the resource set is no greater than 4, it is known which resource is to be used via 2-bit indication information included in each piece of the DCI for scheduling the downlink data. If the number of resources is greater than 4, it is determined which resource is to be used by combining the 2-bit indication information and a time-frequency resource position used by each piece of the DCI for downlink scheduling.

Therefore, when an indication relating to the number of the uplink feedback total payloads is provided in the DCI (for example, the DCI may include DAI_counter and DAI _total fields, where DAI is Downlink Assignment Indicator, and DAI indicates the number of pieces of DCI that use the same feedback position as the current DCI up to the current time), the terminal may determine which resource set is to be used according to the indication of the current number of the total payloads, and then determine the specific resource position according to the indication information (and the time-frequency resource position of the DCI) in each piece of the DCI.

As shown in FIG. 9B, a feedback payload obtained according to an indication of DCI 1 associated with DATA 1 is 2 bits, and the SET 1 may be used. A feedback payload obtained according to an indication of DCI 2 associated with DATA 2 is 2 bits. Thus, PUCCH 1 of SET 1 is reserved upon receiving the DCI 2. And then an indication of DCI 3 associated with DATA 3 is received to obtain the feedback total payload as 4 bits, indicating the resource position is PUCCH 1 in SET 2. Since the PUCCH 1 in SET 2 and the PUCCH 1 in SET1 corresponding to DCI 2 are overlapped in the time domain, it is determined that pieces of feedback associated with DCI 2 and DCI 3 may be multiplexing-transmitted, that is, 2 bits feedback associated with DCI 2 plus 2 bits associated with DCI 3.

Thus, the user terminal may determine a time-frequency resource of a channel for uplink feedback to be used according to the number of the uplink feedback total payloads indicated by each piece of the DCI (assuming that 2 bits uplink feedback is to be fed back for each data). A resource indicated by DCI 1 and resources indicated by DCI 2 and DCI 3 are not overlapped in the time domain, while the resources indicated by DCI 2 and DCI 3 are overlapped in the time domain. Thus, feedback associated with DATA 1 is transmitted on different uplink feedback resources comparing with that of DATA 2 and DATA 3, and pieces of feedback associated with DATA 2 and DATA 3 are transmitted on the same uplink feedback resource.

As can be seen from the above example, the number of the uplink feedback total payloads indicated by each piece of the DCI is firstly determined; the resource set used by the uplink feedback is then determined according to the determined number of the uplink feedback total payloads; finally, the time-frequency resource position of the uplink control channel used by the uplink feedback is determined according to the determined resource set. In this way, the accuracy of determining the time-frequency resource position of the uplink control channel is improved.

Figure 10:
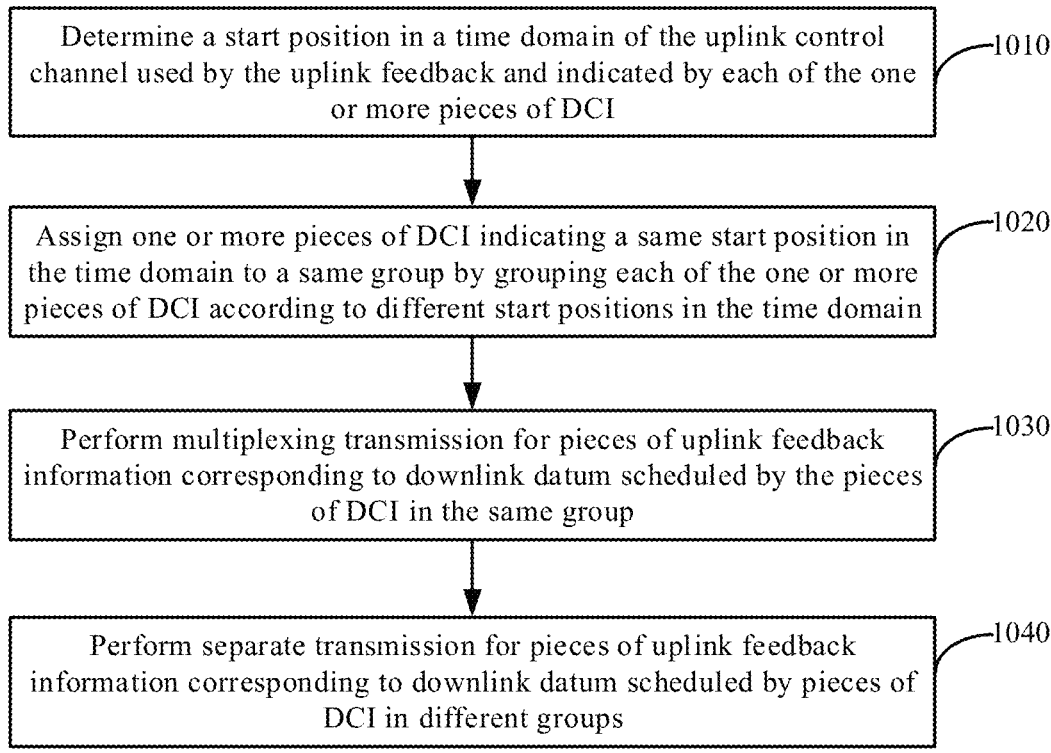
FIG. 10 is a flowchart illustrating another information feedback method according to an example.

FIG. 10 is a flowchart illustrating another information feedback method according to an example. The information feedback method may be applied to a terminal. As shown in FIG. 10, determining the uplink transmission mode of the uplink feedback information corresponding to the downlink data scheduled by the one or more pieces of DCI according to the time-frequency resource position of the uplink control channel indicated by the one or more pieces of DCI for use by the uplink feedback includes the following steps 1010-1040.

At step 1010, a start position in a time domain of the uplink control channel used by the uplink feedback and indicated by the one or more pieces of DCI is determined.

In an example of the present disclosure, if the start positions in the time domain of the uplink control channels used by pieces of uplink feedback and indicated by pieces of DCI are the same, the pieces of uplink feedback may be multiplexed together for transmission; otherwise, the pieces of uplink feedback may be transmitted separately.

At step 1020, one or more pieces of DCI indicating a same start position in the time domain are assigned to a same group by grouping the one or more pieces of DCI according to different start positions in the time domain.

In an example of the present disclosure, when each piece of DCI is grouped according to different start positions in the time domain, the one or more pieces of DCI indicating the same start position in the time domain may be divided into the same group, or the start positions in the time domain indicated by DCI in different groups are different. Pieces of DCI indicating different start positions in the time domain are allowed to be divided into the same group, while the pieces of DCI indicating the same start position in the time domain are not allowed to be divided into different groups.

For example, each piece of DCI that requires information feedback within the specific time unit may be DCI 1, DCI 2 and DCI 3 respectively. Start positions in the time domain indicated by DCI 1 and DCI 2 are the same, while a start position in the time domain indicated by DCI 3 is different from that indicated by DCI 1 and DCI 2. At this time, DCI 1 and DCI 2 may be assigned to one group, and DCI 3 may be assigned to another group separately.

For another example, each piece of DCI that requires information feedback within the specific time unit may be DCI 1, DCI 2 and DCI 3 respectively. Start positions in the time domain indicated by DCI 1, DCI 2 and DCI 3 respectively are different from each other. At this time, DCI 1 and DCI 2 may also be grouped into one group, and DCI 3 may be grouped into another group separately.

At step 1030, multiplexing transmission is performed for pieces of uplink feedback information corresponding to downlink datum scheduled by the pieces of DCI in the same group.

At step 1040, separate transmission is performed for pieces of uplink feedback information corresponding to downlink datum scheduled by pieces of DCI in different groups.

As can be seen from the above example, different pieces of DCI may be grouped according to different start positions in the time domain, the one or more pieces of DCI indicating the same start position in the time domain are divided into the same group, the pieces of uplink feedback information corresponding to the downlink datum scheduled by the pieces of DCI in the same group are multiplexing-transmitted, and the pieces of uplink feedback information corresponding to the downlink datum scheduled by the pieces of DCI in different groups are separately transmitted. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

Figure 11:
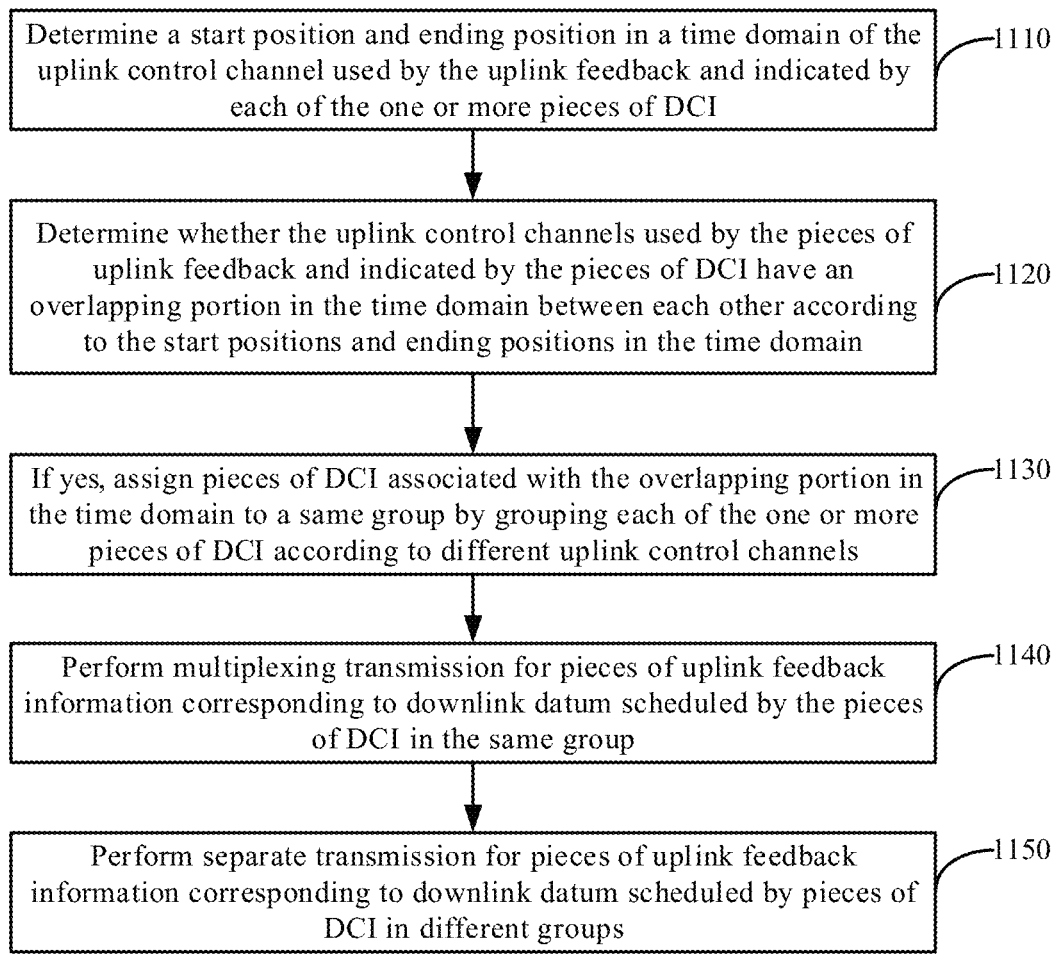
FIG. 11 is a flowchart illustrating another information feedback method according to an example.

FIG. 11 is a flowchart illustrating another information feedback method according to an example. The information feedback method may be applied to a terminal. As shown in FIG. 11, determining the uplink transmission mode of the uplink feedback information corresponding to the downlink data scheduled by the one or more pieces of DCI according to the time-frequency resource position of the uplink control channel used by the uplink feedback and indicated by the one or more pieces of DCI includes the following steps 1110-1150.

At step 1110, a start position and ending position in the time domain of the uplink control channel used by the uplink feedback and indicated by the one or more pieces of DCI are determined.

In an example of the present disclosure, if the uplink control channels used by pieces of uplink feedback and indicated by pieces of DCI are partially overlapped in the time domain, the pieces of uplink feedback may be multiplexed together for transmission; otherwise, pieces of uplink feedback may be transmitted separately.

At step 1120, according to the start position and ending position in the time domain of the uplink control channel used by the uplink feedback and indicated by the one or more pieces of DCI, it is determined whether the uplink control channels used by the pieces of uplink feedback and indicated by the pieces of DCI have an overlapping portion in the time domain between each other.

At step 1130, in response to that the uplink control channels have the overlapping portion in the time domain between each other, pieces of DCI associated with the overlapping portion in the time domain are assigned to a same group by grouping the one or more pieces of DCI according to different uplink control channels.

In an example of the present disclosure, when each piece of DCI is grouped according to different uplink control channels, the pieces of DCI associated with the overlapping portion in the time domain are divided into the same group; or pieces of DCI in different groups are not associated with the overlapping portion in the time domain.

For example, each piece of DCI that requires information feedback within the specific time unit may be DCI 1, DCI 2 and DCI 3 respectively. Uplink control channels indicated by DCI 1 and DCI 2 have an overlapping portion. An uplink control channel indicated by DCI 3 has no overlapping portion with that indicated by DCI 1, and the uplink control channel indicated by DCI 3 has no overlapping portion with that indicated by DCI 2 too. At this time, DCI 1 and DCI 2 may be assigned to one group, and DCI 3 may be assigned to another group separately.

At step 1140, multiplexing transmission is performed for pieces of uplink feedback information corresponding to downlink datum scheduled by the pieces of DCI in the same group.

At step 1150, separate transmission is performed for pieces of uplink feedback information corresponding to downlink datum scheduled by pieces of DCI in different groups.

As can be seen from the above example, different pieces of DCI may be grouped according to different uplink control channels, the one or more pieces of DCI associated with the overlapping portion in the time domain are divided into the same group, the pieces of uplink feedback information corresponding to the downlink datum scheduled by the pieces of DCI in the same group are multiplexing-transmitted, and the pieces of uplink feedback information corresponding to the downlink datum scheduled by the pieces of DCI in different groups are separately transmitted. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

Corresponding to the examples of the above information feedback method, the present disclosure further provides examples of an information feedback apparatus.

Figure 12:
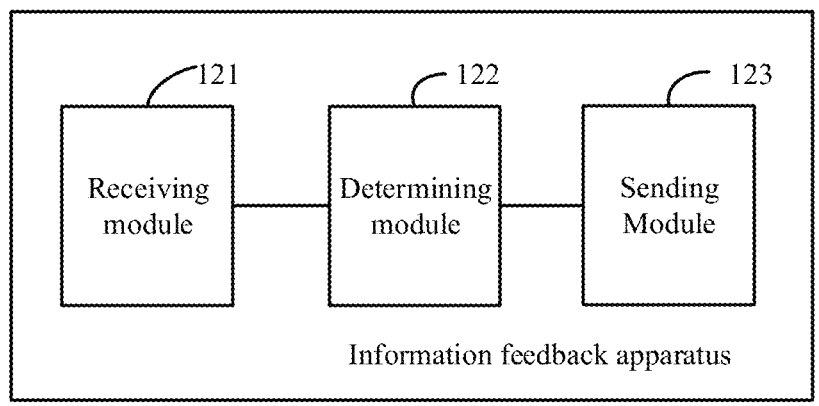
FIG. 12 is a block diagram illustrating an information feedback apparatus according to an example.

FIG. 12 is a block diagram illustrating an information feedback apparatus according to an example. The apparatus may be applied to a terminal and may also be applied to the information feedback method shown in FIG. 1. As shown in FIG. 12, the information feedback apparatus may include:

a receiving module 121 configured to receive downlink data scheduled by one or more pieces of DCI and subjected to information feedback within a specific time unit;

a determining module 122 configured to determining an uplink transmission mode of uplink feedback information corresponding to the downlink data scheduled by the one or more pieces of DCI, wherein the uplink transmission mode comprises multiplexing transmission or separate transmission; and a sending module 123 configured to send the corresponding one or more pieces of uplink feedback information to a base station within the specific time unit according to the uplink transmission modes respectively, such that the base station obtains the corresponding one or more pieces of uplink feedback information within the specific time unit according to the uplink transmission modes respectively.

As can be seen from the above example, after receiving the downlink data scheduled by the one or more pieces of DCI and subjected to information feedback within the specific time unit, the uplink transmission mode of uplink feedback information corresponding to the downlink data scheduled by the one or more pieces of DCI is firstly determined, where the uplink transmission mode includes multiplexing transmission or separate transmission, and then the corresponding one or more pieces of uplink feedback information are sent to a base station within the specific time unit based on the uplink transmission modes determined by the terminal respectively. Such that the base station may obtain the corresponding one or more pieces of uplink feedback information within the specific time unit according to the uplink transmission modes determined by the terminal. Thus, the transmission of uplink feedback information by using different uplink control channels in the same time unit is realized, which satisfies different service requirements of different service types in the new generation communication system, and improves the utility of information feedback.

Figure 13:
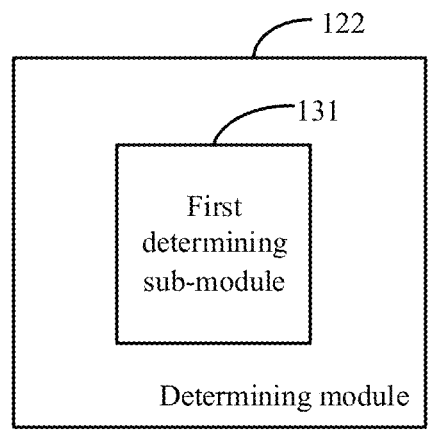
FIG. 13 is a block diagram illustrating another information feedback apparatus according to an example.

In an example, based on the apparatus shown in FIG. 12, as shown in FIG. 13, the determining module 122 may include:

a first determining sub-module 131 configured to determine the uplink transmission mode of the uplink feedback information corresponding to the downlink data scheduled by each piece of DCI according to an information format of the one or more pieces of DCI.

As can be seen from the above example, the uplink transmission mode of the uplink feedback information corresponding to the downlink data scheduled by the one or more pieces of DCI may be determined according to the information format of the one or more pieces of DCI, therefore improving the reliability of determining the uplink transmission mode.

Figure 14:
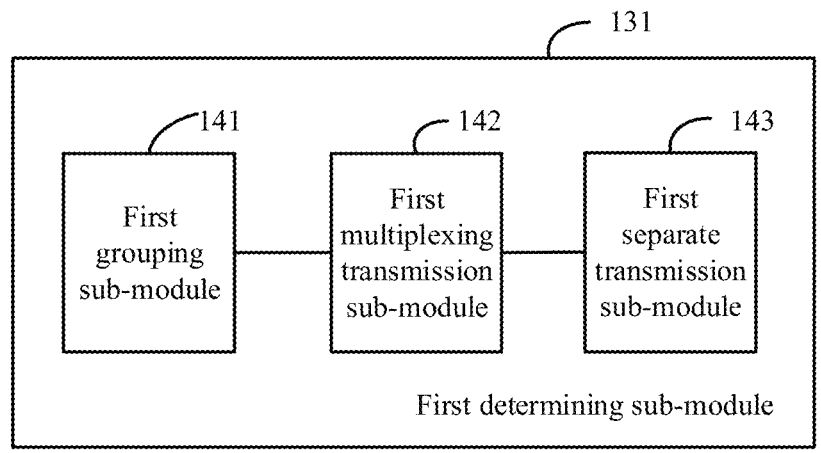
FIG. 14 is a block diagram illustrating another information feedback apparatus according to an example.

In an example, based on the apparatus shown in FIG. 13, as shown in FIG. 14, the first determining sub-module 131 may include:

a first grouping sub-module 141 configured to assign one or more pieces of DCI with a same information format to a same group by grouping the one or pieces of DCI according to different information formats;

a first multiplexing transmission sub-module 142 configured to perform multiplexing transmission for pieces of uplink feedback information corresponding to downlink datum scheduled by the pieces of DCI in the same group; and a first separate transmission sub-module 143 configured to perform separate transmission for pieces of uplink feedback information corresponding to downlink datum scheduled by pieces of DCI in different groups.

As can be seen from the above example, different pieces of DCI may be grouped according to different information formats, the one or more pieces of DCI with the same information format are assigned to the same group, the pieces of uplink feedback information corresponding to the downlink datum scheduled by the pieces of DCI in the same group are multiplexing-transmitted, and the pieces of uplink feedback information corresponding to the downlink datum scheduled by the pieces of DCI in different groups are separately transmitted. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

Figure 15:
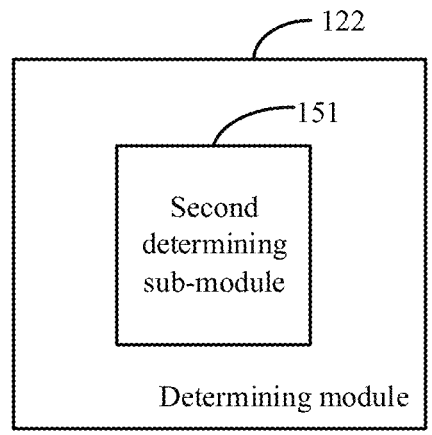
FIG. 15 is a block diagram illustrating another information feedback apparatus according to an example.

In an example, based on the apparatus shown in FIG. 12, as shown in FIG. 15, the determining module 122 may include:

a second determining sub-module 151 configured to determine the uplink transmission mode of the uplink feedback information corresponding to the downlink data scheduled by the one or more pieces of DCI according to a time-frequency resource occupied by the one or more pieces of DCI.

As can be seen from the above example, the uplink transmission mode of the uplink feedback information corresponding to the downlink data scheduled by each piece of the DCI may be determined according to the time-frequency resource occupied by each piece of the DCI, so as to improve the reliability of determining the uplink transmission mode.

Figure 16:
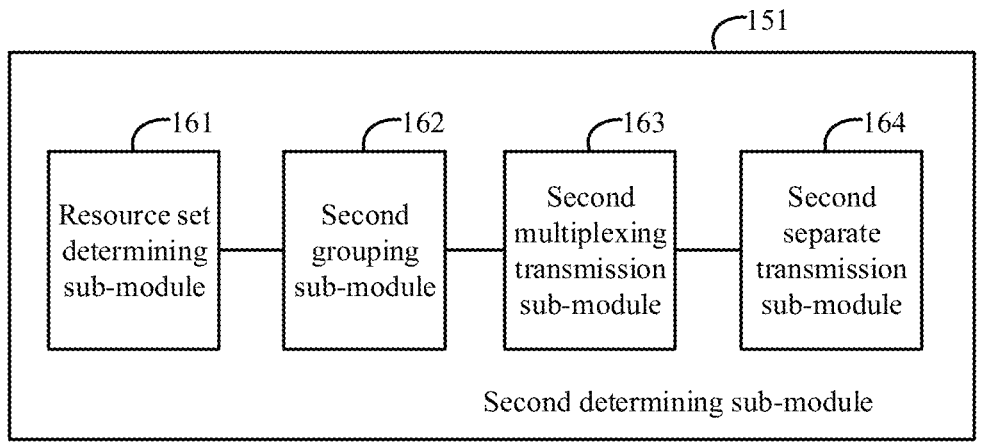
FIG. 16 is a block diagram illustrating another information feedback apparatus according to an example.

In an example, based on the apparatus shown in FIG. 15, as shown in FIG. 16, the second determining sub-module 151 may include:

a resource set determining sub-module 161 configured to determine a resource set of a downlink control channel used by the one or more pieces of DCI;

a second grouping sub-module 162 configured to assign one or more pieces of DCI using a same resource set of a downlink control channel to a same group by grouping the one or more pieces of DCI according to different resource sets of the downlink control channel;

a second multiplexing transmission sub-module 163 configured to perform multiplexing transmission for pieces of uplink feedback information corresponding to downlink datum scheduled by the pieces of DCI in the same group; and a second separate transmission sub-module 164 configured to perform separate transmission for pieces of uplink feedback information corresponding to downlink datum scheduled by pieces of DCI in different groups.

As can be seen from the above example, different pieces of DCI may be grouped according to different resource sets of the downlink control channel, the one or more pieces of DCI with the same resource set of the downlink control channel are grouped to the same group, the pieces of uplink feedback information corresponding to the downlink datum scheduled by the pieces of DCI in the same group are multiplexing-transmit, and the pieces of uplink feedback information corresponding to the downlink datum scheduled by the pieces of DCI in different groups are separately transmit. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

Figure 17:
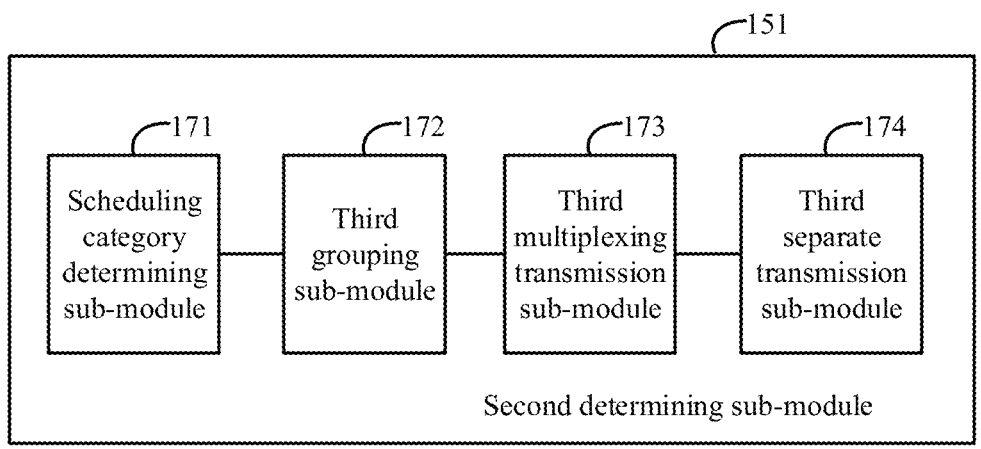
FIG. 17 is a block diagram illustrating another information feedback apparatus according to an example.

In an example, based on the apparatus shown in FIG. 15, as shown in FIG. 17, the second determining sub-module 151 may include:

a scheduling category determining sub-module 171 configured to determine a corresponding downlink scheduling category according to a position in a time domain occupied by the one or more pieces of DCI, wherein the downlink scheduling category comprises slot-based scheduling and/or non-slot-based scheduling;

a third grouping sub-module 172 configured to assign one or more pieces of DCI corresponding to a same downlink scheduling category to a same group by grouping the one or more pieces of DCI according to different downlink scheduling categories;

a third multiplexing transmission sub-module 173 configured to perform multiplexing transmission for pieces of uplink feedback information corresponding to downlink datum scheduled by the pieces of DCI in the same group; and a third separate-transmission sub-module 174 configured to perform separate transmission for pieces of uplink feedback information corresponding to downlink datum scheduled by pieces of DCI in different groups.

As can be seen from the above example, different pieces of DCI may be grouped according to different downlink scheduling categories, the one or more pieces of DCI with the same downlink scheduling category are grouped to the same group, the pieces of uplink feedback information corresponding to the downlink datum scheduled by the pieces of DCI in the same group are multiplexing-transmit, and the pieces of uplink feedback information corresponding to the downlink datum scheduled by the pieces of DCI in different groups are separately transmit. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

Figure 18:
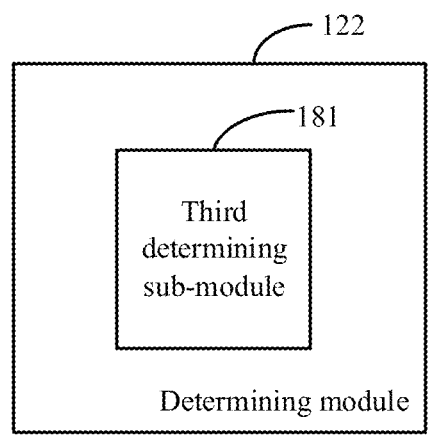
FIG. 18 is a block diagram illustrating another information feedback apparatus according to an example.

In an example, based on the apparatus shown in FIG. 12, as shown in FIG. 18, the determining module 122 may include:

a third determining sub-module 181 configured to determine the uplink transmission mode of the uplink feedback information corresponding to the downlink data scheduled by the one or more pieces of DCI according to an information format of the one or more pieces of DCI and a time-frequency resource occupied by the one or more pieces of DCI.

As can be seen from the above example, the uplink transmission mode of the uplink feedback information corresponding to the downlink data scheduled by each piece of the DCI may be determined according to the information format of each piece of the DCI and the time-frequency resource occupied by each piece of the DCI, so as to improve the reliability of determining the uplink transmission mode.

Figure 19:
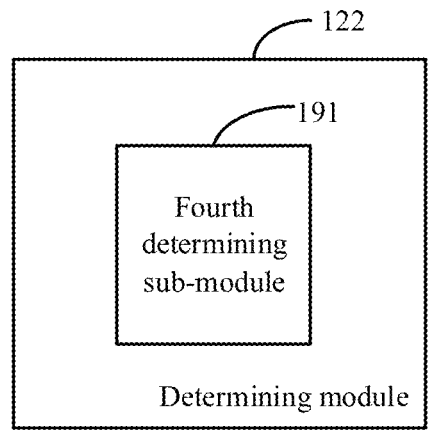
FIG. 19 is a block diagram illustrating another information feedback apparatus according to an example.

In an example, based on the apparatus shown in FIG. 12, as shown in FIG. 19, the determining module 122 may include:

a fourth determining sub-module 191 configured to determine the uplink transmission mode of the uplink feedback information corresponding to the downlink data scheduled by the one or more pieces of DCI according to indication information comprised in the one or more pieces of DCI.

As can be seen from the above example, the uplink transmission mode of the uplink feedback information corresponding to the downlink data scheduled by each piece of DCI may be determined according to the indication information included in each piece of DCI, so as to improve the accuracy of determining the uplink transmission mode.

Figure 20:
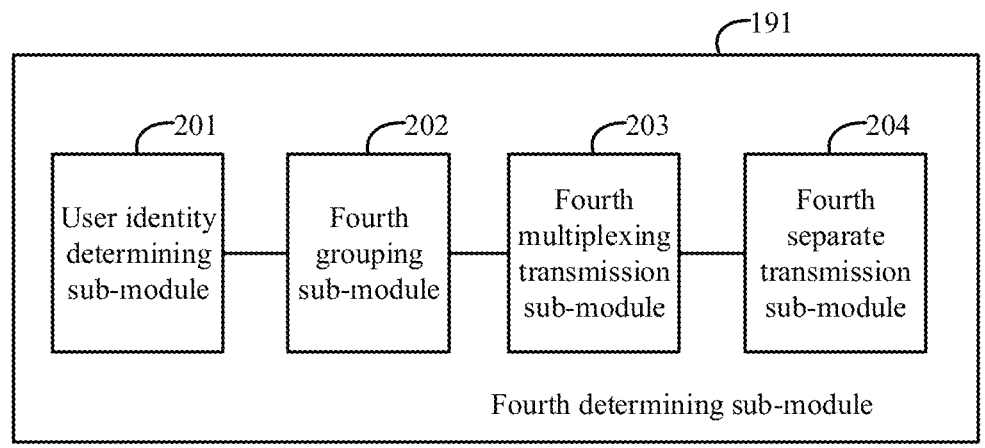
FIG. 20 is a block diagram illustrating another information feedback apparatus according to an example.

In an example, based on the apparatus shown in FIG. 19, the indication information includes a user identifier. As shown in FIG. 20, the fourth determining sub-module 191 may include:

a user identifier determining sub-module 201 configured to determine the user identifier indicated by the one or more pieces of DCI;

a fourth grouping sub-module 202 configured to assign one or more pieces of DCI indicating a same user identifier to a same group by grouping the one or more pieces of DCI according to different user identifiers;

a fourth multiplexing transmission sub-module 203 configured to perform multiplexing transmission for pieces of uplink feedback information corresponding to downlink datum scheduled by the pieces of DCI in the same group; and a fourth separate-transmission sub-module 204 configured to perform separate transmission for pieces of uplink feedback information corresponding to downlink datum scheduled by pieces of DCI in different groups.

As can be seen from the above example, different pieces of DCI may be grouped according to different user identifiers, the one or more pieces of DCI indicating the same user identifier are divided into the same group, the pieces of uplink feedback information corresponding to the downlink datum scheduled by the pieces of DCI in the same group are multiplexing-transmitted, and the pieces of uplink feedback information corresponding to the downlink datum scheduled by the pieces of DCI in different groups are separately transmitted. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

Figure 21:
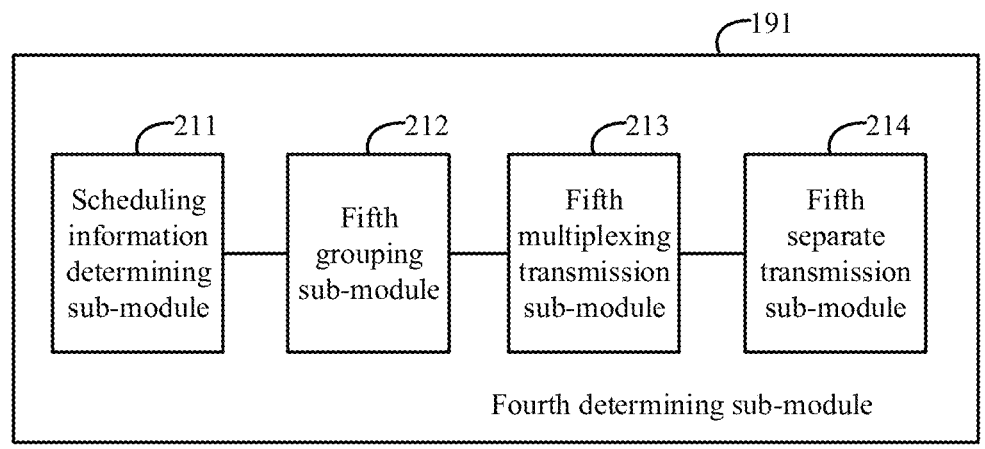
FIG. 21 is a block diagram illustrating another information feedback apparatus according to an example.

In an example, based on the apparatus shown in FIG. 19, the indication information includes downlink data time-frequency scheduling information. As shown in FIG. 21, the fourth determining sub-module 191 may include:

a scheduling information determining sub-module 211 configured to determine the downlink data time-frequency scheduling information indicated by the one or more pieces of DCI;

a fifth grouping sub-module 212 configured to assign one or more pieces of DCI indicating same downlink data time-frequency scheduling information to a same group by grouping the one or more pieces of DCI according to different downlink data time-frequency scheduling information;

a fifth multiplexing transmission sub-module 213 configured to perform multiplexing transmission for pieces of uplink feedback information corresponding to downlink datum scheduled by the pieces of DCI in the same group; and a fifth separate-transmission sub-module 214 configured to perform separate transmission for pieces of uplink feedback information corresponding to downlink datum scheduled by pieces of DCI in different groups.

As can be seen from the above example, different pieces of DCI may be grouped according to different downlink data time-frequency scheduling information, the one or more pieces of DCI indicating the same downlink data time-frequency scheduling information are divided into the same group, the pieces of uplink feedback information corresponding to the downlink datum scheduled by the pieces of DCI in the same group are multiplexing-transmitted, and the pieces of uplink feedback information corresponding to the downlink datum scheduled by the pieces of DCI in different groups are separately transmitted. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

Figure 22:
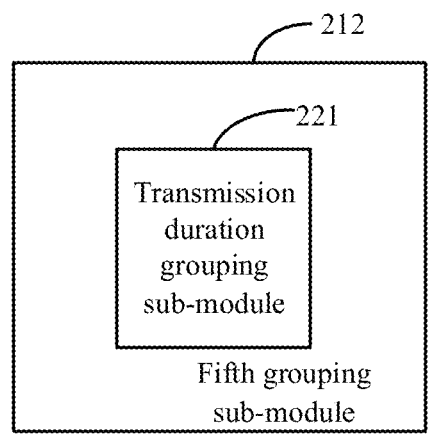
FIG. 22 is a block diagram illustrating another information feedback apparatus according to an example.

In an example, based on the apparatus shown in FIG. 21, the downlink data time-frequency scheduling information includes a transmission duration for transmitting downlink data. As shown in FIG. 22, the fifth grouping sub-module 212 may include:

a transmission duration grouping sub-module 221 configured to assign one or more pieces of DCI indicating a same transmission duration to the same group by grouping the one or more pieces of DCI according to different transmission durations.

As can be seen from the above example, different pieces of DCI may be grouped according to different transmission durations, the one or more pieces of DCI indicating the same transmission duration are divided into the same group, thereby improving the reliability of grouping the DCI.

Figure 23:
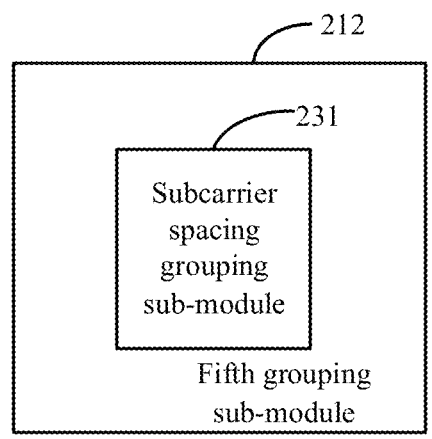
FIG. 23 is a block diagram illustrating another information feedback apparatus according to an example.

In an example, based on the apparatus shown in FIG. 21, the downlink data time-frequency scheduling information includes a subcarrier spacing for transmitting downlink data. As shown in FIG. 23, the fifth grouping sub-module 212 may include:

a subcarrier spacing grouping sub-module 231 configured to assign one or more pieces of DCI indicating a same subcarrier spacing to the same group by grouping the one or more pieces of DCI according to different subcarrier spacings.

As can be seen from the above example, different pieces of DCI may be grouped according to different subcarrier spacings, the one or more pieces of DCI indicating the same subcarrier spacing are divided into the same group, thereby improving the reliability of grouping the DCI.

Figure 24:
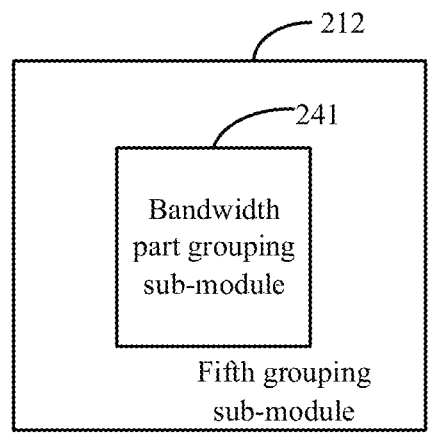
FIG. 24 is a block diagram illustrating another information feedback apparatus according to an example.

In an example, based on the apparatus shown in FIG. 21, the downlink data time-frequency scheduling information includes a bandwidth part for transmitting downlink data. As shown in FIG. 24, the fifth grouping sub-module 212 may include:

a bandwidth part grouping sub-module 241 configured to assign one or more pieces of DCI indicating a same bandwidth part to the same group by grouping the one or more pieces of DCI according to different bandwidth parts.

As can be seen from the above example, different pieces of DCI may be grouped according to different BWPs, the one or more pieces of DCI indicating the same BWP are divided into the same group, thereby improving the reliability of grouping the DCI.

Figure 25:
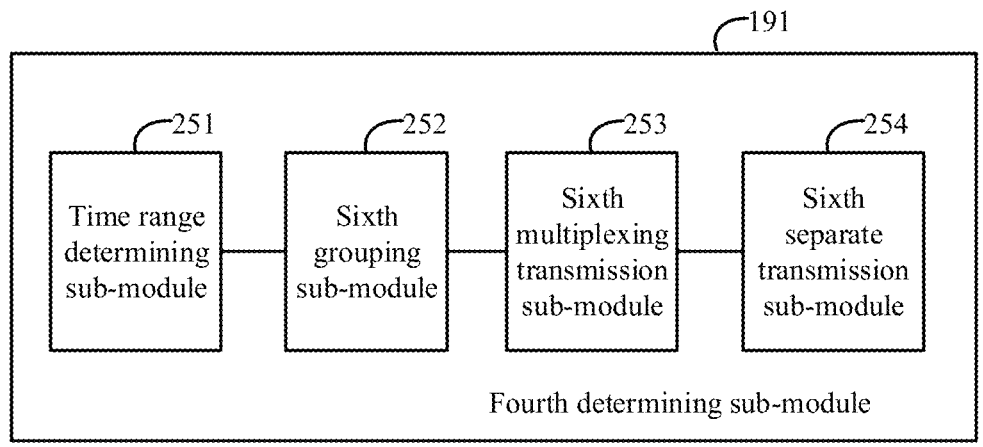
FIG. 25 is a block diagram illustrating another information feedback apparatus according to an example.

In an example, based on the apparatus shown in FIG. 19, the indication information includes a time interval between a downlink data and uplink feedback scheduled by DCI. As shown in FIG. 25, the fourth determining sub-module 191 may include:

a time range determining sub-module 251 configured to determine the time interval between the downlink data and the uplink feedback scheduled by the one or more pieces of DCI and a time range to which the time interval belongs;

a sixth grouping sub-module 252 configured to assign one or more pieces of DCI belonging to a same time range to a same group by grouping the one or more pieces of DCI according to different time ranges;

a sixth multiplexing transmission sub-module 253 configured to perform multiplexing transmission for pieces of uplink feedback information corresponding to downlink datum scheduled by the pieces of DCI in the same group; and a sixth separate-transmission sub-module 254 configured to perform separate transmission for pieces of uplink feedback information corresponding to downlink datum scheduled by pieces of DCI in different groups.

As can be seen from the above example, different pieces of DCI may be grouped according to different time ranges, the one or more pieces of DCI belonging to the same time range are divided into the same group, the pieces of uplink feedback information corresponding to the downlink datum scheduled by the pieces of DCI in the same group are multiplexing-transmitted, and the pieces of uplink feedback information corresponding to the downlink datum scheduled by the pieces of DCI in different groups are separately transmitted. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

Figure 26:
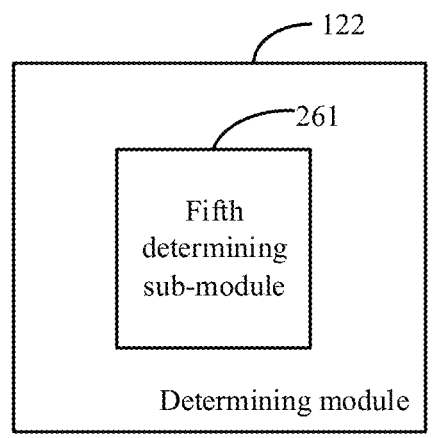
FIG. 26 is a block diagram illustrating another information feedback apparatus according to an example.

In an example, based on the apparatus shown in FIG. 12, as shown in FIG. 26, the determining module 122 may include:

a fifth determining sub-module 261 configured to determine the uplink transmission mode of the uplink feedback information corresponding to the downlink data scheduled by the one or more pieces of DCI according to a time-frequency resource position of an uplink control channel used by uplink feedback and indicated by the one or more pieces of DCI.

As can be seen from the above example, the uplink transmission mode of the uplink feedback information corresponding to the downlink data scheduled by each piece of DCI may be determined according to the time-frequency resource position of the uplink control channel which is used by the uplink feedback and indicated by each piece of the DCI, so as to improve the accuracy of determining the uplink transmission mode.

Figure 27:
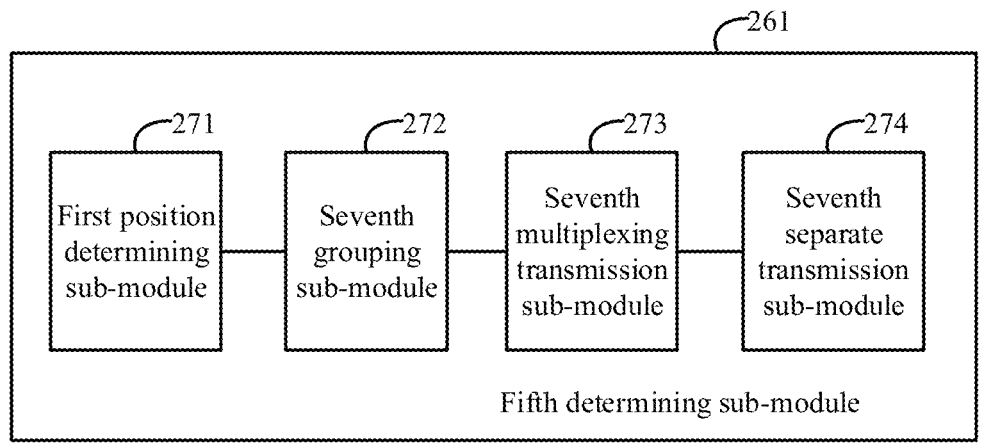
FIG. 27 is a block diagram illustrating another information feedback apparatus according to an example.

In an example, based on the apparatus shown in FIG. 26, as shown in FIG. 27, the fifth determining sub-module 261 may include:

a first position determining sub-module 271 configured to determine the time-frequency resource position of the uplink control channel used by the uplink feedback and indicated by the one or more pieces of DCI;

a seventh grouping sub-module 272 configured to assign one or more pieces of DCI indicating a same time-frequency resource position to a same group by grouping the one or more pieces of DCI according to different time-frequency resource positions of the uplink control channel;

a seventh multiplexing transmission sub-module 273 configured to perform multiplexing transmission for pieces of uplink feedback information corresponding to downlink datum scheduled by the pieces of DCI in the same group; and a seventh separate-transmission sub-module 274 configured to perform separate transmission for pieces of uplink feedback information corresponding to downlink datum scheduled by pieces of DCI in different groups.

As can be seen from the above example, different pieces of DCI may be grouped according to different time-frequency resource positions of the uplink control channel, the one or more pieces of DCI indicating the same time-frequency resource position are divided into the same group, the pieces of uplink feedback information corresponding to the downlink datum scheduled by the pieces of DCI in the same group are multiplexing-transmitted, and the pieces of uplink feedback information corresponding to the downlink datum scheduled by the pieces of DCI in different groups are separately transmitted. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

Figure 28:
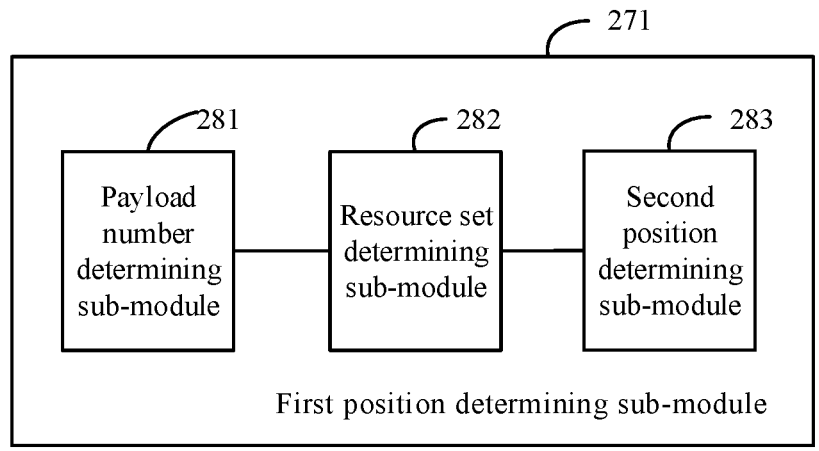
FIG. 28 is a block diagram illustrating another information feedback apparatus according to an example.

In an example, based on the apparatus shown in FIG. 27, as shown in FIG. 28, the first position determining sub-module 271 may include:

a payload number determining sub-module 281 configured to determine a number of uplink feedback total payloads indicated by the one or more pieces of DCI;

a resource set determining sub-module 282 configured to determine a resource set used by the uplink feedback according to the number of the uplink feedback total payloads; and a second position determining sub-module 283 configured to determine the time-frequency resource position of the uplink control channel used by the uplink feedback according to the resource set.

As can be seen from the above example, the number of the uplink feedback total payloads indicated by each piece of the DCI is firstly determined; the resource set used by the uplink feedback is then determined according to the determined number of the uplink feedback total payloads; finally, the time-frequency resource position of the uplink control channel used by the uplink feedback is determined according to the determined resource set. In this way, the accuracy of determining the time-frequency resource position of the uplink control channel is improved.

Figure 29:
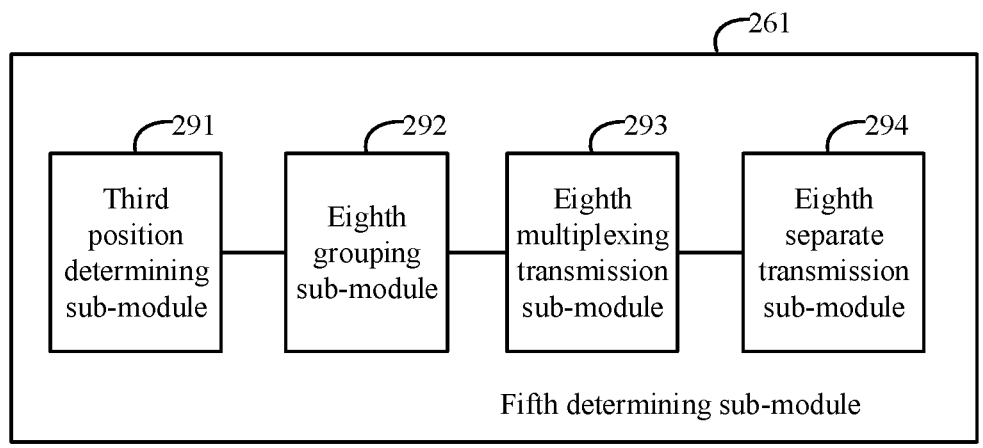
FIG. 29 is a block diagram illustrating another information feedback apparatus according to an example.

In an example, based on the apparatus shown in FIG. 26, as shown in FIG. 29, the fifth determining sub-module 261 may include:

a third position determining sub-module 291 configured to determine a start position in a time domain of the uplink control channel used by the uplink feedback and indicated by the one or more pieces of DCI;

an eighth grouping sub-module 292 configured to assign one or more pieces of DCI indicating a same start position in the time domain to a same group by grouping the one or more pieces of DCI according to different start positions in the time domain;

an eighth multiplexing transmission sub-module 293 configured to perform multiplexing transmission for pieces of uplink feedback information corresponding to downlink datum scheduled by the pieces of DCI in the same group; and an eighth separate-transmission sub-module 294 configured to perform separate transmission for pieces of uplink feedback information corresponding to downlink datum scheduled by pieces of DCI in different groups.

As can be seen from the above example, different pieces of DCI may be grouped according to different start positions in the time domain, the one or more pieces of DCI indicating the same start position in the time domain are divided into the same group, the pieces of uplink feedback information corresponding to the downlink datum scheduled by the pieces of DCI in the same group are multiplexing-transmitted, and the pieces of uplink feedback information corresponding to the downlink datum scheduled by the pieces of DCI in different groups are separately transmitted. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

Figure 30:
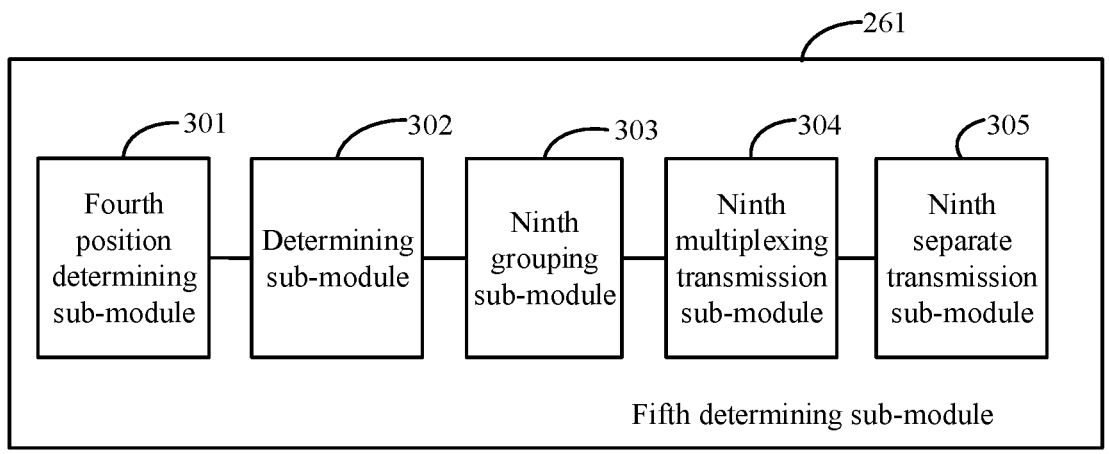
FIG. 30 is a block diagram illustrating another information feedback apparatus according to an example.

In an example, based on the apparatus shown in FIG. 26, as shown in FIG. 30, the fifth determining sub-module 261 may include:

a fourth position determining sub-module 301 configured to determine a start position and ending position in a time domain of the uplink control channel used by the uplink feedback and indicated by the one or more pieces of DCI;

a determining sub-module 302 configured to determine whether the uplink control channels used by the pieces of uplink feedback and indicated by the pieces of DCI have an overlapping portion in the time domain between each other according to the start positions and ending positions in the time domain;

a ninth grouping sub-module 303 configured to, in response to determining that there is the overlapping portion in the time domain by the determining sub-module, assign pieces of DCI indicating uplink control channels having the overlapping portion in the time domain to a same group by grouping the one or more pieces of DCI according to different uplink control channels;

a ninth multiplexing transmission sub-module 304 configured to perform multiplexing transmission for pieces of uplink feedback information corresponding to downlink datum scheduled by the pieces of DCI in the same group; and a ninth separate-transmission sub-module 305 configured to perform separate transmission for pieces of uplink feedback information corresponding to downlink datum scheduled by pieces of DCI in different groups.

As can be seen from the above example, different pieces of DCI may be grouped according to different uplink control channels, the one or more pieces of DCI associated with the overlapping portion in the time domain are divided into the same group, the pieces of uplink feedback information corresponding to the downlink datum scheduled by the pieces of DCI in the same group are multiplexing-transmitted, and the pieces of uplink feedback information corresponding to the downlink datum scheduled by the pieces of DCI in different groups are separately transmitted. In this way, the one or more pieces of uplink feedback information corresponding to the downlink datum scheduled by the one or more pieces of DCI in the same group are transmitted by using the same uplink control channel, while the pieces of uplink feedback information corresponding to the downlink datum scheduled by the pieces of DCI in different groups are transmitted by using different uplink control channels. Thus, the different service requirements of different service types in the new generation communication system are satisfied, and the efficiency of information feedback is improved.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

An example of the present disclosure further provides a non-transitory computer readable storage medium storing computer programs, where the computer programs are used to perform the above information feedback method described in any one of FIGS. 1-11.

The present disclosure further provides an information feedback apparatus applied to a terminal. The apparatus includes:

a processor; and a memory storing instructions executable by the processor.

The processor is configured to:

receive downlink data scheduled by one or more pieces of DCI and subjected to information feedback within a specific time unit;

determine an uplink transmission mode of uplink feedback information corresponding to the downlink data scheduled by the one or more pieces of DCI, wherein the uplink transmission mode comprises multiplexing transmission or separate transmission; and send the corresponding one or more pieces of uplink feedback information to a base station within the specific time unit according to the uplink transmission modes respectively, such that the base station obtains the corresponding one or more pieces of uplink feedback information within the specific time unit according to the uplink transmission modes respectively.

Figure 31:
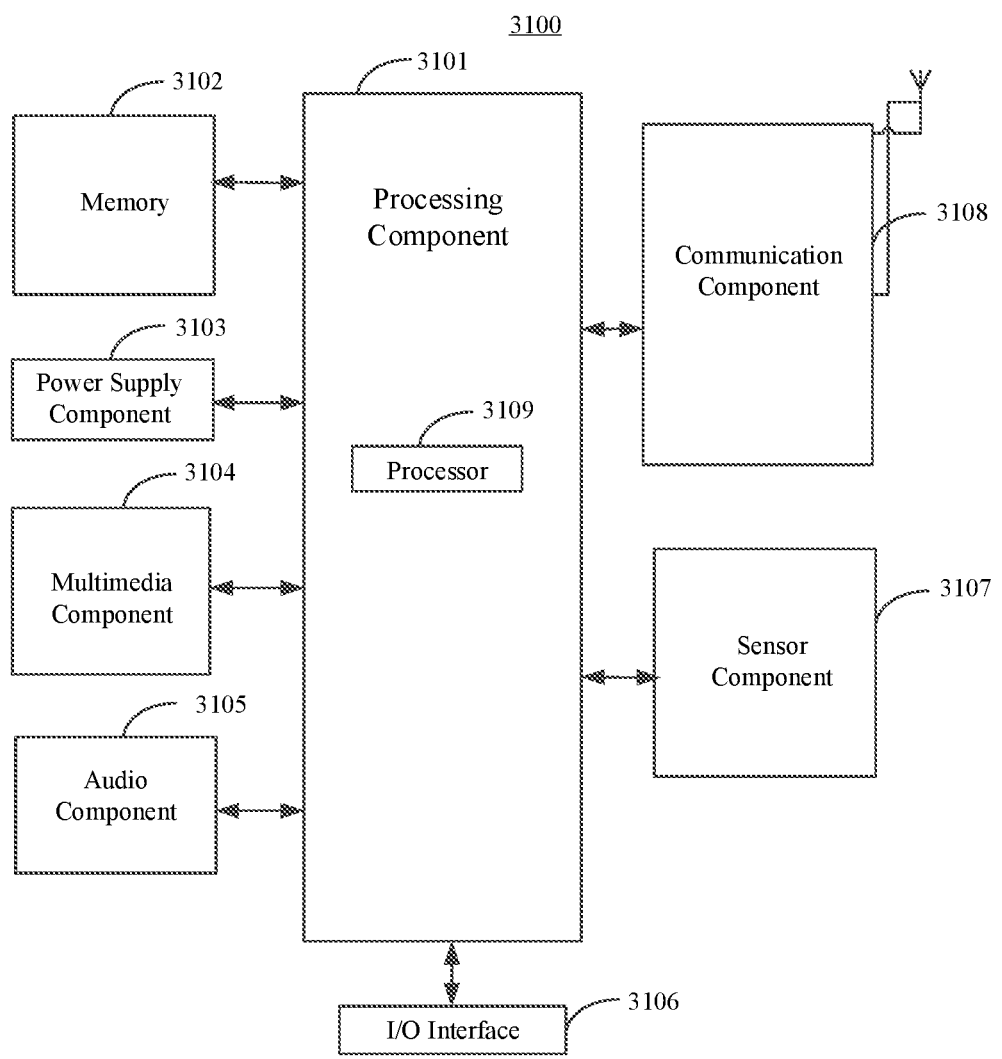
FIG. 31 is a structural schematic diagram illustrating an information feedback apparatus according to an example.

FIG. 31 is a structural schematic diagram illustrating an information feedback apparatus according to an example. As shown in FIG. 31, an information feedback apparatus 3100 is illustrated according to an example, and the apparatus 3100 may be a terminal such as a computer, a mobile phone, a digital broadcast terminal, a message transceiver, a game console, a tablet device, a medical device, a fitness device, a personal digital assistant, or the like.

As shown in FIG. 31, the apparatus 3100 may include one or more of the following components: a processing component 3101, a memory 3102, a power supply component 3103, a multimedia component 3104, an audio component 3105, an input/output (I/O) interface 3106, a sensor component 3107 and a communication component 3108.

The processing component 3101 generally controls overall operations of the apparatus 3100, such as operations associated with display, phone calls, data communications, camera operations, and recording operations. The processing component 3101 may include one or more processors 3109 to execute instructions to complete all or part of the steps of the above methods. In addition, the processing component 3101 may include one or more modules which facilitate the interaction between the processing component 3101 and other components. For example, the processing component 3101 may include a multimedia module to facilitate the interaction between the multimedia component 3104 and the processing component 3101.

The memory 3102 is to store various types of data to support the operation of the apparatus 3100. Examples of such data include instructions for any application or method operated on the apparatus 3100, contact data, phonebook data, messages, pictures, videos, and so on. The memory 3102 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 3103 supplies power for different components of the apparatus 3100. The power supply component 3103 may include a power supply management system, one or more power supplies, and other components associated with generating, managing and distributing power for the apparatus 3100.

The multimedia component 3104 includes a screen providing an output interface between the apparatus 3100 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 3104 may include a front camera and/or a rear camera. The front camera and/or rear camera may receive external multimedia data when the apparatus 3100 is in an operating mode, such as a photographing mode or a video mode. The front camera and the rear camera may be a fixed optical lens system or have focal length and optical zooming capability.

The audio component 3105 is to output and/or input an audio signal. For example, the audio component 3105 includes a microphone (MIC). When the apparatus 3100 is in an operating mode, such as a call mode, a record mode and a voice recognition mode, the microphone is to receive an external audio signal. The received audio signal may be further stored in the memory 3102 or sent via the communication component 3108. In some examples, the audio component 3105 further includes a speaker for outputting an audio signal.

The I/O interface 3106 provides an interface between the processing component 3101 and a peripheral interface module. The above peripheral interface module may be a keyboard, a click wheel, buttons, or the like. These buttons may include but not limited to, a home button, a volume button, a start button and a lock button.

The sensor component 3107 includes one or more sensors to provide status assessments of various aspects for the apparatus 3100. For example, the sensor component 3107 may detect the on/off status of the apparatus 3100, and relative positioning of component, for example, the component is a display and a keypad of the apparatus 3100. The sensor component 3107 may also detect a change in position of the apparatus 3100 or a component of the apparatus 3100, a presence or absence of the contact between a user and the apparatus 3100, an orientation or an acceleration/deceleration of the apparatus 3100, and a change in temperature of the apparatus 3100. The sensor component 3107 may include a proximity sensor to detect the presence of a nearby object without any physical contact. The sensor component 3107 may further include an optical sensor, such as a Complementary Metal-Oxide-Semiconductor (CMOS) or Charged Coupled Device (CCD) image sensor which is used in imaging applications. In some examples, the sensor component 3107 may further include an acceleration sensor, a gyroscope sensor, a magnetic sensor, a pressure sensor, or a temperature sensor.

The communication component 3108 is to facilitate wired or wireless communication between the apparatus 3100 and other devices. The apparatus 3100 may access a wireless network based on a communication standard, such as Wi-Fi, 2G or 3G, or a combination thereof. In an example, the communication component 3108 receives a broadcast signal or broadcast related information from an external broadcast management system via a broadcast channel. In an example, the communication component 3108 may further include a Near Field Communication (NFC) module for promoting short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In an example, the apparatus 3100 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is further provided a non-transitory computer readable storage medium including instructions, such as the memory 3102 including instructions. The above instructions may be executed by the processor 3109 of the apparatus 3100 to complete the above method. For example, the non-transitory computer readable storage medium may be a Read-Only Memory (ROM), a Random Access Memory (RAM), a CD-ROM, a magnetic tape, a floppy disk, an optical data storage device, and so on.

When the instructions in the storage medium are executed by the processor, the apparatus 3100 is caused to implement the information feedback method according to any one of the above examples.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. An information feedback method, being applied to a terminal, and comprising:
   receiving downlink data scheduled by one or more pieces of Downlink Control Information (DCI) and subjected to information feedback within a specific time unit;
   determining uplink transmission modes of uplink feedback information corresponding to the downlink data scheduled by the one or more pieces of DCI, wherein the uplink transmission mode comprises multiplexing transmission or separate transmission; and
   respectively sending corresponding one or more pieces of uplink feedback information to a base station within the specific time unit according to the uplink transmission modes, such that the base station obtains the corresponding one or more pieces of uplink feedback information within the specific time unit according to the uplink transmission modes.

2. The method according to claim 1, wherein determining the uplink transmission mode of the uplink feedback information corresponding to the downlink data scheduled by the one or more pieces of DCI comprises:
   determining the uplink transmission mode of the uplink feedback information corresponding to the downlink data scheduled by the one or more pieces of DCI according to an information format of the one or more pieces of DCI.

3. The method according to claim 2, wherein determining the uplink transmission mode of the uplink feedback information corresponding to the downlink data scheduled by the one or more pieces of DCI according to the information format of the one or more pieces of DCI comprises:
   grouping the one or more pieces of DCI according to respective information formats, wherein pieces of DCI with a same information format are grouped to a same group, and pieces of DCI with different information formats are grouped to different groups;
   performing multiplexing transmission for pieces of uplink feedback information corresponding to downlink datum scheduled by the pieces of DCI in the same group; and performing separate transmission for pieces of uplink feedback information corresponding to downlink datum scheduled by pieces of DCI in different groups.

4. The method according to claim 1, wherein determining the uplink transmission mode of the uplink feedback information corresponding to the downlink data scheduled by the one or more pieces of DCI comprises:
determining the uplink transmission mode of the uplink feedback information corresponding to the downlink data scheduled by the one or more pieces of DCI according to a time-frequency resource occupied by the one or more pieces of DCI.

5. The method according to claim 4, wherein determining the uplink transmission mode of the uplink feedback information corresponding to the downlink data scheduled by the one or more pieces of DCI according to the time-frequency resource occupied by the one or more pieces of DCI comprises:
determining a resource set of a downlink control channel used by the one or more pieces of DCI;
grouping the one or more pieces of DCI according to respective resource sets of the downlink control channel, wherein pieces of DCI using a same resource set of a downlink control channel are grouped to a same group, and wherein pieces of DCI with different resource sets of the downlink control channel are grouped to different groups;
performing multiplexing transmission for pieces of uplink feedback information corresponding to downlink datum scheduled by the pieces of DCI in the same group; and
performing separate transmission for pieces of uplink feedback information corresponding to downlink datum scheduled by pieces of DCI in different groups.

6. The method according to claim 4, wherein determining the uplink transmission mode of the uplink feedback information corresponding to the downlink data scheduled by the one or more pieces of DCI according to the time-frequency resource occupied by the one or more pieces of DCI comprises:
determining a corresponding downlink scheduling category according to a position in a time domain occupied by the one or more pieces of DCI, wherein the downlink scheduling category comprises slot-based scheduling and/or non-slot-based scheduling;
grouping the one or more pieces of DCI according to respective downlink scheduling categories, wherein pieces of DCI corresponding to a same downlink scheduling category are grouped to a same group, and wherein pieces of DCI with different downlink scheduling categories are grouped to different groups;
performing multiplexing transmission for pieces of uplink feedback information corresponding to downlink datum scheduled by the pieces of DCI in the same group; and
performing separate transmission for pieces of uplink feedback information corresponding to downlink datum scheduled by pieces of DCI in different groups.

7. The method according to claim 1, wherein determining the uplink transmission mode of the uplink feedback information corresponding to the downlink data scheduled by the one or more pieces of DCI comprises:
determining the uplink transmission mode of the uplink feedback information corresponding to the downlink data scheduled by the one or more pieces of DCI according to an information format of the one or more pieces of DCI and a time-frequency resource occupied by the one or more pieces of DCI.

8. The method according to claim 1, wherein determining the uplink transmission mode of the uplink feedback information corresponding to the downlink data scheduled by the one or more pieces of DCI comprises:
determining the uplink transmission mode of the uplink feedback information corresponding to the downlink data scheduled by the one or more pieces of DCI according to indication information comprised in the one or more pieces of DCI.

9. The method according to claim 8, wherein the indication information comprises a user identifier; and
determining the uplink transmission mode of the uplink feedback information corresponding to the downlink data scheduled by the one or more pieces of DCI according to the indication information comprised in the one or more pieces of DCI comprises:
determining the user identifier indicated by the one or more pieces of DCI;
grouping the one or more pieces of DCI according to respective user identifiers, wherein pieces of DCI indicating a same user identifier are grouped to a same group, and wherein pieces of DCI with different user identifiers are grouped to different groups;
performing multiplexing transmission for pieces of uplink feedback information corresponding to downlink datum scheduled by the pieces of DCI in the same group; and
performing separate transmission for pieces of uplink feedback information corresponding to downlink datum scheduled by pieces of DCI in different groups.

10. The method according to claim 8, wherein the indication information comprises downlink data time-frequency scheduling information; and
determining the uplink transmission mode of the uplink feedback information corresponding to the downlink data scheduled by the one or more pieces of DCI according to the indication information comprised in the one or more pieces of DCI comprises:
determining the downlink data time-frequency scheduling information indicated by the one or more pieces of DCI;
grouping the one or more pieces of DCI according to respective downlink data time-frequency scheduling information, wherein pieces of DCI indicating same downlink data time-frequency scheduling information are grouped to a same group, and wherein pieces of DCI with different downlink data time-frequency scheduling information are grouped to different groups;
performing multiplexing transmission for pieces of uplink feedback information corresponding to downlink datum scheduled by the pieces of DCI in the same group; and
performing separate transmission for pieces of uplink feedback information corresponding to downlink datum scheduled by pieces of DCI in different groups.

11. The method according to claim 10, wherein the downlink data time-frequency scheduling information comprises a transmission duration for transmitting the downlink data; and
grouping the one or more pieces of DCI according to respective downlink data time-frequency scheduling information comprises:

grouping the one or more pieces of DCI according to transmission durations, wherein pieces of DCI indicating a same transmission duration are grouped to the same group, and wherein pieces of DCI with different transmission durations are grouped to different groups.

12. The method according to claim 10, wherein the downlink data time-frequency scheduling information comprises a subcarrier spacing for transmitting the downlink data; and
grouping the one or more pieces of DCI according to respective downlink data time-frequency scheduling information comprises:
grouping the one or more pieces of DCI according to respective sub carrier spacings, wherein pieces of DCI indicating a same subcarrier spacing are grouped to the same group, and wherein pieces of DCI with different subcarrier spacings are grouped to different groups.

13. The method according to claim 10, wherein the downlink data time-frequency scheduling information comprises a bandwidth part for transmitting the downlink data;
grouping the one or more pieces of DCI according to respective downlink data time-frequency scheduling information comprises:
grouping the one or more pieces of DCI according to respective bandwidth parts, wherein pieces of DCI indicating a same bandwidth part are grouped to the same group, and wherein pieces of DCI with different bandwidth parts are grouped to different groups.

14. The method according to claim 8, wherein the indication information comprises a time interval between a downlink data and uplink feedback scheduled by DCI; and
determining the uplink transmission mode of the uplink feedback information corresponding to the downlink data scheduled by the one or more pieces of DCI according to the indication information comprised in the one or more pieces of DCI comprises:
determining the time interval between the downlink data and the uplink feedback scheduled by the one or more pieces of DCI and a time range to which the time interval belongs;
grouping the one or more pieces of DCI according to respective time ranges, wherein pieces of DCI belonging to a same time range are grouped to a same group, and wherein pieces of DCI with different time ranges are grouped to different groups;
performing multiplexing transmission for pieces of uplink feedback information corresponding to downlink datum scheduled by the pieces of DCI in the same group; and
performing separate transmission for pieces of uplink feedback information corresponding to downlink datum scheduled by pieces of DCI in different groups.

15. The method according to claim 1, wherein determining the uplink transmission mode of the uplink feedback information corresponding to the downlink data scheduled by the one or more pieces of DCI comprises:
determining the uplink transmission mode of the uplink feedback information corresponding to the downlink data scheduled by the one or more pieces of DCI according to a time-frequency resource position of an uplink control channel used by uplink feedback and indicated by the one or more pieces of DCI.

16. The method according to claim 15, wherein determining the uplink transmission mode of the uplink feedback information corresponding to the downlink data scheduled by the one or more pieces of DCI according to the time-frequency resource position of the uplink control channel used by the uplink feedback and indicated by the one or more pieces of DCI comprises:
determining the time-frequency resource position of the uplink control channel used by the uplink feedback and indicated by the one or more pieces of DCI;
grouping the one or more pieces of DCI according to respective time-frequency resource positions of the uplink control channel, wherein pieces of DCI indicating a same time-frequency resource position are grouped to a same group, and wherein pieces of DCI with different time-frequency resource positions of the uplink control channel are grouped to different groups;
performing multiplexing transmission for pieces of uplink feedback information corresponding to downlink datum scheduled by the pieces of DCI in the same group; and
performing separate transmission for pieces of uplink feedback information corresponding to downlink datum scheduled by pieces of DCI in different groups.

17. The method according to claim 16, wherein determining the time-frequency resource position of the uplink control channel used by the uplink feedback and indicated by the one or more pieces of DCI comprises:
determining a number of uplink feedback total payloads indicated by the one or more pieces of DCI;
determining a resource set used by the uplink feedback according to the number of the uplink feedback total payloads; and
determining the time-frequency resource position of the uplink control channel used by the uplink feedback according to the resource set.

18. The method according to claim 15, wherein determining the uplink transmission mode of the uplink feedback information corresponding to the downlink data scheduled by the one or more pieces of DCI according to the time-frequency resource position of the uplink control channel used by the uplink feedback and indicated by the one or more pieces of DCI comprises:
determining a start position in a time domain of the uplink control channel used by the uplink feedback and indicated by the one or more pieces of DCI;
grouping the one or more pieces of DCI according to respective start positions in the time domain, wherein pieces of DCI indicating a same start position in the time domain are grouped to a same group, and wherein pieces of DCI with different start positions in the time domain are grouped to different groups;
performing multiplexing transmission for pieces of uplink feedback information corresponding to downlink datum scheduled by the pieces of DCI in the same group; and
performing separate transmission for pieces of uplink feedback information corresponding to downlink datum scheduled by pieces of DCI in different groups.

19. The method according to claim 15, wherein determining the uplink transmission mode of the uplink feedback information corresponding to the downlink data scheduled by the one or more pieces of DCI according to the time-frequency resource position of the uplink control channel used by the uplink feedback and indicated by the one or more pieces of DCI comprises:

determining a start position and ending position in a time domain of the uplink control channel used by the uplink feedback and indicated by the one or more pieces of DCI;

determining whether the uplink control channels used by the pieces of uplink feedback and indicated by the pieces of DCI have an overlapping portion in the time domain between each other according to the start positions and ending positions in the time domain;

grouping the one or more pieces of DCI according to respective uplink control channels in response to that the uplink control channels have the overlapping portion in the time domain between each other, wherein pieces of DCI associated with the overlapping portion in the time domain are grouped to a same group, and wherein pieces of DCI according to different uplink control channels are grouped to different groups;

performing multiplexing transmission for pieces of uplink feedback information corresponding to downlink datum scheduled by the pieces of DCI in the same group; and performing separate transmission for pieces of uplink feedback information corresponding to downlink datum scheduled by pieces of DCI in different groups.

20. An information feedback apparatus, being applied to a terminal, and comprising:

a processor; and a memory storing instructions executable by the processor, wherein the processor is configured to:

receive downlink data scheduled by one or more pieces of DCI and subjected to information feedback within a specific time unit;

determine an uplink transmission mode of uplink feedback information corresponding to the downlink data scheduled by the one or more pieces of DCI, wherein the uplink transmission mode comprises multiplexing transmission or separate transmission; and send the corresponding one or more pieces of uplink feedback information to a base station within the specific time unit according to the uplink transmission modes respectively, such that the base station obtains the corresponding one or more pieces of uplink feedback information within the specific time unit according to the uplink transmission modes respectively.

* * * * *